US010719537B2

(12) United States Patent
Herold

(10) Patent No.: US 10,719,537 B2
(45) Date of Patent: Jul. 21, 2020

(54) METHOD AND APPARATUS FOR PERFORMING A GEOMETRIC TRANSFORMATION ON OBJECTS IN AN OBJECT-ORIENTED ENVIRONMENT USING A MULTIPLE-TRANSACTION TECHNIQUE

(71) Applicant: Hexagon Technology Center GmbH, Heerbrugg (CH)

(72) Inventor: Steven D. Herold, Madison, AL (US)

(73) Assignee: Hexagon Technology Center GmbH, Heerbrugg (CH)

( * ) Notice: Subject to any disclaimer, the term of this patent is extended or adjusted under 35 U.S.C. 154(b) by 487 days.

(21) Appl. No.: 14/731,564

(22) Filed: Jun. 5, 2015

(65) Prior Publication Data

US 2015/0269247 A1  Sep. 24, 2015

Related U.S. Application Data

(63) Continuation-in-part of application No. 13/736,357, filed on Jan. 8, 2013, now abandoned.
(Continued)

(51) Int. Cl.
*G06F 16/28* (2019.01)
*G06F 16/25* (2019.01)
(Continued)

(52) U.S. Cl.
CPC .......... *G06F 16/288* (2019.01); *G06F 3/0481* (2013.01); *G06F 16/2365* (2019.01);
(Continued)

(58) Field of Classification Search
CPC ............... G06F 17/30607; G06F 17/50; G06F 17/30371; G06F 17/40; G06F 16/288; G06Q 40/04
See application file for complete search history.

(56) References Cited

U.S. PATENT DOCUMENTS

| 5,692,184 A | 11/1997 | Ardoin et al. ................ 395/614 |
| 6,052,691 A | 4/2000 | Ardoin et al. ................ 707/102 |

(Continued)

FOREIGN PATENT DOCUMENTS

| EP | 1 538 537 A2 | 6/2005 | ............. G06F 17/30 |
| TW | 2005 15278 | 5/2005 | ............... G06F 9/00 |

(Continued)

OTHER PUBLICATIONS

European Patent Office, International Searching Authority, International Search Report, International Application No. PCT/US2015/034345, together with the Written Opinion, 21 pages, dated Mar. 7, 2016.

(Continued)

*Primary Examiner* — Mariela Reyes
*Assistant Examiner* — Courtney Harmon
(74) *Attorney, Agent, or Firm* — Nutter McClennen & Fish LLP

(57) ABSTRACT

A large number of objects, such as objects representing beams and columns in an object-oriented enterprise engineering system, may be geometrically transformed in a model database by dividing the objects according to criteria into a number of ordered partitions and transforming the objects in each partition as an atomic operation. The number of objects that may be transformed is not constrained by the amount of memory available in the system. Objects that are to be transformed are organized into the ordered partitions, and the partitions are transformed in sequential order, such that all predecessors of a given object are transformed before, or in the same operation as, the given object. If a large transformation operation abnormally terminates before all the small transformation operations have been completed, the model database is, nevertheless, left in a consistent state. The transformation operation may be resumed from the point of interruption.

15 Claims, 32 Drawing Sheets

Related U.S. Application Data

(60) Provisional application No. 61/596,797, filed on Feb. 9, 2012.

(51) Int. Cl.
*G06F 16/23* (2019.01)
*G06F 3/0481* (2013.01)
*G06F 30/00* (2020.01)
*G06F 111/04* (2020.01)

(52) U.S. Cl.
CPC .......... *G06F 16/258* (2019.01); *G06F 16/289* (2019.01); *G06F 30/00* (2020.01); *G06F 2111/04* (2020.01)

(56) References Cited

U.S. PATENT DOCUMENTS

| | | | |
|---|---|---|---|
| 6,292,804 B1 | 9/2001 | Ardoin et al. | 707/102 |
| 6,633,869 B1 | 10/2003 | Duparcmeur et al. | 707/6 |
| 6,772,168 B2 | 8/2004 | Ardoin et al. | 707/102 |
| 7,467,268 B2 | 12/2008 | Lindemann et al. | 711/162 |
| 8,793,218 B2 | 7/2014 | Herold et al. | 707/647 |
| 2001/0016807 A1 | 8/2001 | Hashima et al. | 703/22 |
| 2003/0014286 A1* | 1/2003 | Cappellini | G06Q 10/02 705/5 |
| 2004/0107125 A1 | 6/2004 | Guheen et al. | 705/7 |
| 2004/0133588 A1 | 7/2004 | Kiessig et al. | 707/102 |
| 2007/0088724 A1* | 4/2007 | Demiroski | G06F 9/4492 |
| 2009/0240737 A1 | 9/2009 | Hardisty et al. | 707/200 |
| 2009/0300083 A1 | 12/2009 | Herold et al. | 707/204 |
| 2010/0042676 A1* | 2/2010 | Seroussi | G06F 30/13 709/203 |
| 2010/0153150 A1* | 6/2010 | Prigge | G06Q 10/063 705/7.11 |
| 2010/0318999 A1* | 12/2010 | Zhao | G06F 9/5044 718/104 |
| 2013/0212505 A1 | 8/2013 | Herold | 715/765 |
| 2013/0300740 A1* | 11/2013 | Snyder | G06F 3/016 345/420 |

FOREIGN PATENT DOCUMENTS

| | | | | |
|---|---|---|---|---|
| TW | 2005 15278 A | 5/2005 | ............ | G06F 9/00 |
| TW | 2007 36953 | 10/2007 | ............ | G06F 21/00 |
| WO | WO 2011/066513 A2 | 6/2011 | ............ | G06F 17/50 |
| WO | WO 2013/119390 A1 | 8/2013 | ............ | G06F 17/50 |

OTHER PUBLICATIONS

Attaluri, "Issues in Managing Long Transactions and Large Objects in a Multidatabase System," Cascon '92 Proceedings of the 1992 Conference of the Centre for Advanced Studies on Collaborative Research, vol. 2, pp. 129-151, 1992.

Batz, et al., "A Data Model Supporting System Engineering," IEEE, pp. 178-185, 1988.

Hsu, et al., "A Constraint-based Manipulator Toolset for Editing 3D Objects," Proceedings of the Fourth Symposium on Solid Modeling and Applications, Atlanta, GA, pp. 168-180, May 14-16, 1997.

Skarra, "Concurrency Control for Cooperating Transactions in an Object-Oriented Database," Proceedings of the 2009 ACM Sigplan Conference on Programming Language Design and Implementation, vol. 24, No. 4, pp. 145-147, Apr. 1, 1989.

Sohrt, et al., "Interaction with Constraints in 3D Modeling," Proceedings, Symposium on Solid Modeling Foundation and CAD/CAM Applications, pp. 387-396, Jun. 5, 1991.

The International Bureau of WIPO, International Preliminary Report on Patentability—International Application No. PCT/US2013/022851, dated Aug. 21, 2014, together with the Written Opinion of the International Searching Authority, 12 pages.

Australian Patent Office, Patent Examination Report No. 1, dated Sep. 23, 2013 pertaining to Application No. 2009256381, 3 pages.

Australian Patent Office, Patent Examination Report No. 1, dated Apr. 29, 2015 pertaining to Application No. 2013217676, 4 pages.

Canadian Intellectual Property Office, Office Action dated Nov. 5, 2012 pertaining to Application No. 2,717,802, 3 pages.

Canadian Intellectual Property Office, Office Action dated Dec. 10, 2013 pertaining to Application No. 2,717,802, 4 pages.

Canadian Intellectual Property Office, Office Action dated Dec. 2, 2014 pertaining to Application No. 2,717,802, 3 pages.

European Patent Office, Communication pursuant to Rules 161(1) and 162 EPC dated Jan. 18, 2011 pertaining to Application No. 09759206.7-1527/2281253, 2 pages.

International Searching Authority—European Patent Office, International Search Report—International Application No. PCT/US2009/045910, dated Dec. 4, 2009, together with the Written Opinion of the International Searching Authority, 14 pages.

International Searching Authority, International Search Report—International Application No. PCT/US2013/022851, dated May 10, 2013, together with the Written Opinion of the International Searching Authority, 16 pages.

Korean Patent Office, Notice of Preliminary Rejection dated Mar. 27, 2013, pertaining to Application No. 10-2010-7022060, 3 pages.

Korean Patent Office, Notice of Preliminary Rejection dated Mar. 27, 2013, pertaining to Application No. 10-2010-7022060, 1 page [English Translation].

Taiwan Patent Office, Office Action dated Apr. 9, 2014 pertaining to Application No. 98118242 together with TIPO's Search Report, 4 pages.

Taiwan Patent Office, Office Action dated Apr. 9, 2014 pertaining to Application No. 98118242 together with TIPO's Search Report, 5 pages [English Summary].

The State Intellectual Property Office of the People's Republic of China, Office Action dated Jun. 12, 2012 pertaining to Application No. 200980111665.7, 3 pages.

The State Intellectual Property Office of the People's Republic of China, Office Action dated Jun. 12, 2012 pertaining to Application No. 200980111665.7, 4 pages [English Translation].

United States Patent and Trademark Office, Office Action dated Oct. 11, 2011 pertaining to U.S. Appl. No. 12/476,399, 25 pages.

United States Patent and Trademark Office, Final Office Action dated Apr. 17, 2012 pertaining to U.S. Appl. No. 12/476,399, 30 pages.

United States Patent and Trademark Office, Office Action dated Oct. 18, 2012 pertaining to U.S. Appl. No. 12/476,399, 22 pages.

United States Patent and Trademark Office, Final Office Action dated Apr. 1, 2013 pertaining to U.S. Appl. No. 12/476,399, 21 pages.

United States Patent and Trademark Office, Office Action dated Jan. 9, 2015 pertaining to U.S. Appl. No. 13/736,357, 27 pages.

* cited by examiner

← Partition Transformation Order →

| Model Data Transform |
|---|

Plant
Select the plant containing the objects to be transformed.

Plant:

| SDH_9059_ModelA | Select Plant |

~600

| < Back | Next > | Cancel |

*Fig. 6*

```
Model Data Transform

Operation
Begin a new operation or restart an existing operation
```

⦿ Begin a new operation ——700

Name: ——704

[Move Area1]

Permission Group: ——706

[Permission Group 1 ▼]

○ Restart an existing operation ——702

Operations: ——708

| Name | Status | Created By | Date Created |
|------|--------|------------|--------------|
| Move 2 | Completed | INGRNET\sdherolc | 1/20/2011 10:54:41 A |
| Move 1 | Incomplete | INGRNET\sdherolc | 1/20/2011 10:32:22 A |

[Properties]
[Delete]

[< Back] [Next >] [Cancel]

*Fig. 7*

Model Data Transform

Transformations
Specify the type of transformations to be applied to the copied objects.

◉ Move ⁓1100
   East distance: 1102   North distance: 1104   Up distance: 1106   Units: 1108
   [500.00 m]   [0.00 m]   [0.00 m]   [m ▼]

○ Rotate ⁓1110
   Axis coordinate system:   Angle of rotation (deg):
   [      ][...]   [      ]

○ Move and rotate ⁓1112
   From coordinate system:   To coordinate system
   [      ][...]   [      ][...]

[< Back]  [Next >]  [Cancel]

*Fig. 11*

```
<?xml version="1.0" encoding="windows-1252" ?>
<!--
============================================
File name:
    SystemsCCD.xml
Description:
    Copy class definitions for System objects
============================================
-->
<XML>
  <CopyClasses>
    <CopyClass Name = "CPMSystem" ClassId = "{5008FB84-BDB3-11D1-88A5-08003600F843}">
      <TargetsInPredecessors>
        <!--The parent system is a predecessor for this system-->
        <Path>
          <Step StepType ="DirectedRel" RelName = "SystemHierarchy"
                RelType = "{A8CE36E7-A53F-4558-8DF9-F0BCE6583327}"
                Dir = "Backward"/>
        </Path>
      </TargetsInPredecessors>
      <TargetsInSelf>
        <!--The System itself may be a target-->
        <Path>
          <Step StepType ="Null"/>
        </Path>
      </TargetsInSelf>
    </CopyClass>
  </CopyClasses>
</XML>
```

*Fig. 18*

| Source Partition | Flags | Object Pointer |
|---|---|---|

*Fig. 25*

| Origin Index | Destination Index | Relationship Pointer |
|---|---|---|

*Fig. 26*

Transaction 1: Move objects in Partition 1

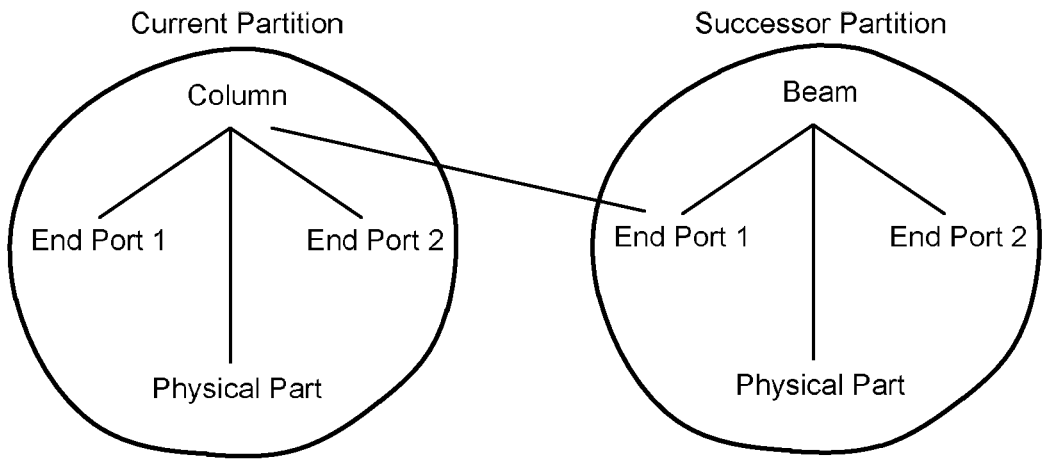

| Add initial objects to transform graph – Initial object (Column) from current partition and initial object (Beam) from successor partition |
|---|
| Expand transform graph by propagation – Propagation from initial objects adds subordinate objects (End Port 1, End Port 2, etc.) |
| Disconnection – No external relationships, so no relationships to disconnect (Pass 1) |
| Transformation – Transform Column and its subordinate objects (End Port 1, End Port 2, etc.) (Pass 2) |
| Compute – Evaluate functional dependencies. Here, no re-computation. (Pass 1) |
| Commit – Save modified objects' representations to database |

*Fig. 30*

Transaction 3: Move objects in Partition 3

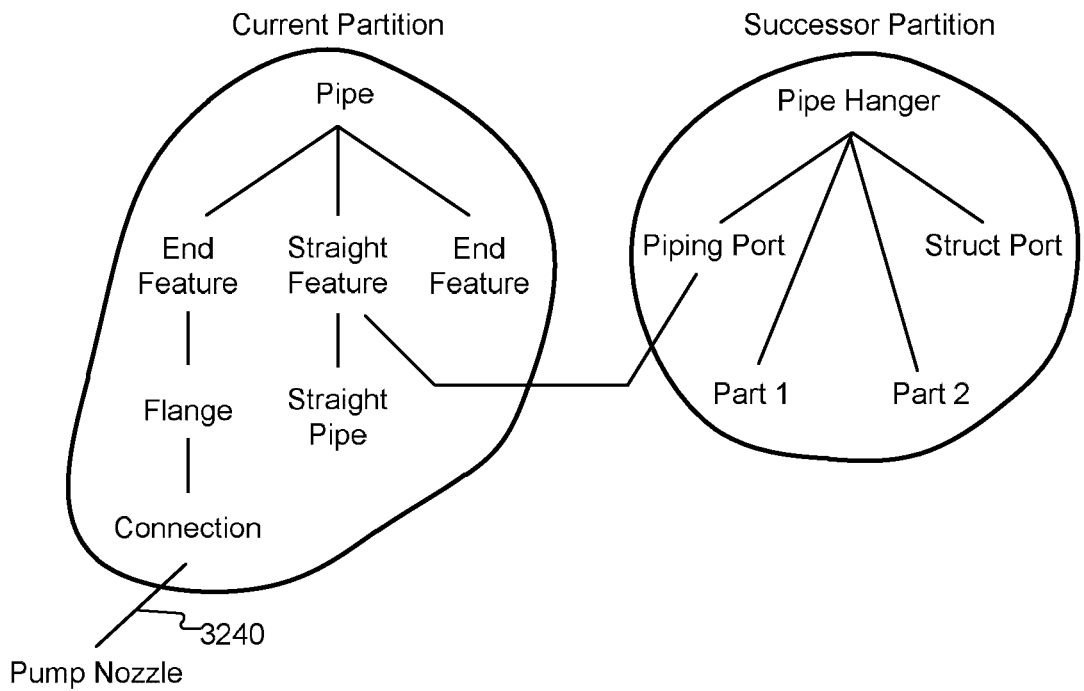

| Add initial objects to transform graph – Initial object (Pipe) from current partition and initial object (Pipe Hanger) from successor partition |
|---|
| Expand transform graph by propagation – Propagation from initial objects adds subordinate objects (Straight Feature, Flange, etc.) |
| Disconnection – Disconnect external relationship to Nozzle (Pass 1) |
| Transformation – Transform Pipe and its subordinate objects (End Feature, Flange, etc.) (Pass 2) |
| Compute – Evaluate functional dependencies. Here, because the Pump can exist independently, recompute parameters of the Pipe, because it is no longer connected to the Nozzle. Recompute parameters of the Nozzle and/or Pump, because they are no longer connected to anything. The Pump becomes an independent object. (Pass 1) |
| Commit – Save modified objects' representations to database |

*Fig. 32*

METHOD AND APPARATUS FOR PERFORMING A GEOMETRIC TRANSFORMATION ON OBJECTS IN AN OBJECT-ORIENTED ENVIRONMENT USING A MULTIPLE-TRANSACTION TECHNIQUE

CROSS REFERENCE TO RELATED APPLICATIONS

This application is a continuation-in-part of U.S. patent application Ser. No. 13/736,357, filed Jan. 8, 2013, titled "Method and Apparatus for Performing a Geometric Transformation on Objects in an Object-Oriented Environment Using a Multiple-Transaction Technique," which claims priority to U.S. Provisional Patent Application No. 61/596,797, filed Feb. 9, 2012, titled "Method and Apparatus for Performing a Geometric Transformation on Objects in an Object-Oriented Environment Using a Multiple-Transaction Technique," the entire contents of each of which are hereby incorporated by reference herein, for all purposes.

TECHNICAL FIELD

The present invention relates to computer-aided design and computer-aided manufacturing (CAD/CAM) software systems and, more particularly, to methods and apparatus for performing geometric transformations on large numbers of objects and relationships in databases used by such systems.

BACKGROUND ART

Enterprise engineering systems, sometimes also referred to as spatial information management (SIM) systems, are computer-aided design (CAD) systems that facilitate two-dimensional (2D) and three-dimensional (3D) modeling and visualization. These systems are used in the design, construction, operation and modification of industrial plants, such as oil refineries and power generating stations, as well as other large, complex structures, such as high-rise buildings, off-shore drilling platforms, ships and mining and other materials handling facilities. With their graphical user interfaces (GUIs), enterprise engineering systems enable designers to lay out structural, piping, electrical, heating, ventilating and air conditioning (HVAC) and other complex systems and to visualize all or selected portions of a project at various stages of construction or operation.

Most modern enterprise engineering systems utilize object-oriented paradigms, in which software constructs called "objects" represent real-world items, such as beams, walls, floors, pipe runs, valves, conduits, switches, fans, ducts and the like. Some objects represent items, such as coordinate grid systems, that are mere conveniences to a designer and do not represent physical items.

Objects are typically implemented in software as data structures (ordered groups of data elements) that store information identifying the types of items represented, as well as information (such as length, width, color, capacity, etc., as appropriate for each item) about the specific item represented by each object. Objects typically also include "methods," which are routines that manipulate the data elements of the object and/or return information about the objects to callers. Objects that represent items within a user's problem domain and that are made visible to the user by a SIM system and that can be manipulated by the user via the SIM system user interface (UI) are sometimes referred to as "design objects" to distinguish them from other objects (referred to as "business objects") that may not be directly visible to the user but that are, nonetheless, necessary for the model.

Many design objects are made up of other objects. For example, a pipe run may include one or more straight pipe segments, elbows, flanges, gaskets and the like. The pipe run may include two or more nozzles, by which ends of the pipe run may be connected to equipment, such as pumps, tanks, valves, etc. A SIM may expose the pipe run as a design object, which a user can manipulate. For example, the user may stretch, bend, shorten or move the pipe run. However, the SIM may not necessarily expose the individual straight pipe segments, elbows, etc. to the user for direct manipulation. Instead, the SIM may automatically add or remove these objects, or alter their characteristics, such as angle of an elbow, as needed in response to a user's manipulation of a design object.

In another example, a beam may be composed of a single member system and many other objects including: frame connections (representing how the beam is connected to other members at each end), parts (representing the final physical objects), holes (representing connection points along the beam) and other objects. Openings in a beam may be represented by respective additional objects. If an end of a beam is trimmed or notched to fit against column, the trim or notch operation may also be represented by an object. Collectively, a design object and its related objects are referred to as a "design object group."

Most objects are linked to other objects by means of relationships. Different types of relationships are used in different contexts. For example, one type of relationship is used to arrange objects into a logical hierarchy of "systems." A different type of relationship is used when a pipe is connected to a nozzle on a piece of equipment. A third type of relationship is used to connect a beam to a column.

Relationships between objects are ordered concepts. A relationship may indicate a logical order in which the corresponding objects were added to a model, which may be different than the order the real-world items will be constructed. For example, when modeling a power plant building, a designer typically establishes a grid coordinate system. The designer then adds columns and places the columns at desired coordinates within the grid system. Later, the designer adds footings under the columns. However, when the power plant is actually built, the footings are constructed before the columns can be put in place on top of the footings.

Another type of relationship between objects is a "functional dependency." A functional dependency may exist between related objects (an "independent" object and one or more "dependent" objects). When an independent object is changed, all dependent objects are automatically changed as well. In the previous column and footing example, the column is the independent object and the footing is dependent on it. If the column is moved or the weight it must bear changes, the enterprise engineering systems automatically moves the footing or automatically changes its size or weight-bearing capacity as required. In addition, characteristics of any other objects that are dependents of the column are automatically recalculated by the enterprise engineering system. Updating an object, i.e., recalculating one or more of the object's parameters, is sometimes referred to as "recomputing" the object.

As noted, during the modeling phase, a column object is typically added to a model before a corresponding footing object is added to the model. However, when the physical structure (ex., a power plant) is constructed, the footing must be built before the column can be attached to the top of the footing. Thus, the order in which objects are added to a model is not necessarily the same as the order in which corresponding real-world items are constructed or put in place. Similarly, functional dependency relationships do not necessarily indicate the order in which real-world items are constructed or put in place.

Many modern enterprise engineering systems utilize relational databases (RDBs) or other database management systems (DBMSs) to store persistent data structures that represent objects and relationships. For example, RDB records or table rows may be used to store object and relationship data structures.

One particularly useful feature of enterprise engineering systems is the ability to geometrically transform a user-selected object or group of objects. Examples of geometric transformations include moving, rotating and mirroring.

In order to maintain validity and consistency of objects and relationships in a model database, every operation on that database is performed within a database transaction. A transaction has two main purposes: 1) to provide a reliable unit of work that allows for correct recovery from system failures; and 2) to provide isolation between programs accessing a database concurrently. A transaction provides an "all or nothing" proposition. Either all modifications to the database are completed successfully or none are completed.

Thus, to ensure validity and consistency of the model, an enterprise engineering system performs a geometric transformation in a single transaction. The transaction includes three steps. In the first step, the transaction is started and all data structures representing the objects and relationships to be transformed are brought from the database into (real or virtual, collectively referred to as "main") memory of a computer. In the second step, the objects are transformed in the main memory and all dependent objects are recomputed. Then, in the third step, the (now modified) data structures representing objects and relationships are written back to the database and the transaction is committed.

Many industrial plant models involve very large numbers of objects and relationships, which can pose problems for enterprise engineering systems. A system's main memory must be large enough to simultaneously store all the data structures representing the objects that are to be geometrically transformed and their relationships. As is well known, databases can be much larger than main memories of computers. Therefore, selecting a large portion of a model for a geometric transformation, such as moving a distiller within a petrochemical plant, may cause the main memory capacity of the computer to be exceeded, in which case the transformation cannot be completed.

SUMMARY OF EMBODIMENTS

An embodiment of the present invention provides a computer-implemented method for geometrically transforming a subset of objects. The objects are represented within an object-oriented enterprise engineering system. The method includes a processor performing a set of operations.

The operations include accepting input on a computer from a user. The input specifies a set of selected objects to be geometrically transformed. The input also indicates a type of geometric transformation to be performed on the selected objects. Representations of the selected objects are stored in an object-oriented enterprise engineering system database. However, the computer has insufficient main memory to simultaneously store the representations of all the selected objects.

For each selected object, the processor automatically identifies, among the selected objects, all predecessor objects with which the selected object has a predecessor-successor relationship. A predecessor-successor relationship means: (a) a value of a parameter of the selected object must be recalculated, according to an engineering relationship, when a corresponding value of a parameter of the predecessor object changes to a changed value, and (b) the predecessor-successor relationship exists from prior to commencement of the method to after completion of the method.

The processor automatically generates an ordered list of the selected objects. The order of the selected objects in the list is based on predecessors of the selected objects.

The processor automatically divides the list into a set of ordered partitions. Each selected object is a member of a partition no earlier than all its predecessor objects' partitions.

The processor performs two passes over the partitions.

In a first pass, for each partition in order, the processor performs the following operations:

(a) The processor loads a representation of each object of the partition from the database into the main memory of the computer.

(b) The processor automatically identifies any relationships between the objects of the partition and any objects that are not members of the plurality of selected objects.

(c) For each automatically identified relationship, the processor automatically modifies the representation of the corresponding object in the main memory to sever the relationship. Thus, the processor creates a first plurality of modified representations of objects in the main memory.

(d) The processor stores the first plurality of modified representations of objects from the main memory into the database.

(e) The processor releases the main memory into which the representation of each object was loaded.

After completion of the first pass, the processor performs a second pass over the partitions. In the second pass, for each partition in order, the processor performs the following operations:

(a) The processor loads a representation of each object of the partition from the database into the main memory of the computer.

(b) For each object of the partition, the processor modifies the representation of the object in the main memory to geometrically transform the object according to the type of geometric transformation to be performed. Thus, the processor creates a second plurality of modified representations of objects in the main memory.

(c) The processor stores the second plurality of modified representations of objects from the main memory into the database.

(d) The processor releases the main memory into which the representation of each object was loaded.

Automatically generating the ordered list of the selected objects may include automatically generating the ordered list, such that each selected object appears in the list no earlier than all its predecessor objects.

Automatically generating the ordered list of the selected objects may include automatically generating an ordered list of object identifiers of the selected objects.

The method may also include performing additional operations for at least one partition of the ordered set of partitions. The method may include identifying any subordinate objects of the selected objects in the partition. The method may include adding the identified subordinate objects to the partition. The method may include loading a representation of each subordinate object of the partition from the database into the main memory of the computer. The method may include modifying the representation of the subordinate objects in the main memory to geometrically transform the subordinate object according to the type of geometric transformation to be performed. The method may include releasing the main memory into which the representation of each subordinate object was loaded.

The method may also include automatically saving information about the set of ordered partitions in a non-volatile memory. The information may be sufficient to enable restarting the modification of the representations of the objects in the main memory to geometrically transform the objects according to the type of geometric transformation to be performed after a system failure.

Automatically dividing the list into a set of ordered partitions may include generating a predecessor graph that relates each selected object to all the selected object's predecessor objects.

The method may also include, for each object whose relationship is severed, automatically recomputing a functional dependency of the object.

Another embodiment of the present invention provides a system for geometrically transforming a subset of objects represented within a memory-constrained object-oriented enterprise engineering system. The system includes an object-oriented enterprise engineering system database that stores representations of objects. A user interface accepts input from a user. The input specifies a set of selected objects among the objects represented in the database to be geometrically transformed. The input also includes an indication of a type of geometric transformation to be performed on the selected objects.

A computer includes main memory. However, the main memory is insufficient to simultaneously store the representations of all the selected objects.

The system includes an identification module coupled to the user interface and to the database. For each selected object, the identification module automatically identifies, among the selected objects, all predecessor objects with which the selected object has a predecessor-successor relationship. A predecessor-successor relationship means: (a) a value of a parameter of the selected object must be recalculated, according to an engineering relationship, when a corresponding value of a parameter of the predecessor object changes to a changed value, and (b) the predecessor-successor relationship exists from prior to receiving the user input to after the selected objects have been geometrically transformed.

The system also includes an object ordering module coupled to the identification module. The object ordering module automatically generates an ordered list of the selected objects based on predecessors of the selected objects.

A partitioning module is coupled to the object ordering module. The partitioning module automatically divides the list into a set of ordered partitions. Each selected object is a member of a partition no earlier than all its predecessor objects' partitions.

A relationship terminator is coupled to the partitioning module. The relationship terminator automatically processes each partition in order. During a first pass the relationship terminator loads a representation of each object of the partition from the database into the main memory of the computer. The relationship terminator automatically identifies any relationships between the objects of the partition and any objects that are not members of the plurality of selected objects. For each automatically identified relationship, the relationship terminator automatically modifies the representation of the corresponding object in the main memory to sever the relationship. The relationship terminator thereby creates a first plurality of modified representations of objects in the main memory. The relationship terminator stores the first plurality of modified representations of objects from the main memory into the database. The relationship terminator releases the main memory into which the representation of each object was loaded.

The system also includes a geometric transformer coupled to the relationship terminator. The geometric transformer automatically processes each partition in order. After completion of the first pass, during a second pass, the geometric transformer loads a representation of each object of the partition from the database into the main memory of the computer. For each object of the partition, the geometric transformer modifies the representation of the object in the main memory to geometrically transform the object according to the type of geometric transformation to be performed. The geometric transformer thereby creates a second plurality of modified representations of objects in the main memory. The geometric transformer releases the main memory into which the representation of each object was loaded.

The geometric transformer stores the second plurality of modified representations of objects from the main memory into the database.

The object ordering module may automatically generate the ordered list, such that each selected object appears in the list no earlier than all its predecessor objects.

The object ordering module may automatically generate an ordered list of object identifiers of the selected objects.

The system may include a propagation module coupled to the identification module. The propagation module may, for each partition, identify any subordinate objects of the selected objects in the partition and add the identified subordinate objects to the partition. The propagation module may load a representation of each subordinate object of the partition from the database into the main memory of the computer. The propagation module may modify the representation of the subordinate objects in the main memory to geometrically transform the subordinate object according to the type of geometric transformation to be performed. The propagation module releases the main memory into which the representation of each subordinate object was loaded.

The system may also include a process control module coupled to the geometric transformer. The process control module may automatically save information about the set of ordered partitions in a non-volatile memory. The information may be sufficient to enable restarting the modification of the representations of the objects in the main memory to geometrically transform the objects according to the type of geometric transformation to be performed after a system failure.

The partitioning module may generate a predecessor graph that relates each selected object to all the selected object's predecessor objects.

The system may include an object recalculator coupled to the relationship terminator. The object recalculator may, for each object whose relationship is severed, to automatically recompute a functional dependency of the object.

Yet another embodiment of the present invention provides a computer program product for geometrically transforming a subset of objects represented within a memory-constrained object-oriented enterprise engineering system. The computer program product includes a non-transitory computer-readable medium. Computer instructions are stored on the medium. When executed by a processor, the instructions cause the processor to accept input on a computer from a user. The input specifies a set of selected objects to be geometrically transformed. The input also includes an indication of a type of geometric transformation to be performed on the selected objects. Representations of the selected objects are stored in an object-oriented enterprise engineering system database. However, the computer has insufficient main memory to simultaneously store the representations of all the selected objects.

For each selected object, the processor automatically identifies, among the selected objects, all predecessor objects with which the selected object has a predecessor-successor relationship. A predecessor-successor relationship means: (a) a value of a parameter of the selected object must be recalculated, according to an engineering relationship, when a corresponding value of a parameter of the predecessor object changes to a changed value, and (b) the predecessor-successor relationship exists from prior to execution of the instructions to after execution of the instructions.

The processor automatically generates an ordered list of the selected objects based on predecessors of the selected objects.

The processor automatically divides the list into a set of ordered partitions. Each selected object is a member of a partition no earlier than all its predecessor objects' partitions.

In a first pass, for each partition in order, the processor loads a representation of each object of the partition from the database into the main memory of the computer. The processor automatically identifies any relationships between the objects of the partition and any objects that are not members of the plurality of selected objects. For each automatically identified relationship, the processor automatically modifies the representation of the corresponding object in the main memory to sever the relationship. Thereby, the processor creates a first plurality of modified representations of objects in the main memory. The processor also stores the first plurality of modified representations of objects from the main memory into the database. The processor releases the main memory into which the representation of each object was loaded.

After completing the first pass, in a second pass, for each partition in order, the processor loads a representation of each object of the partition from the database into the main memory of the computer. For each object of the partition, the processor modifies the representation of the object in the main memory to geometrically transform the object according to the type of geometric transformation to be performed. The processor thereby creates a second plurality of modified representations of objects in the main memory. The processor stores the second plurality of modified representations of objects from the main memory into the database. The processor releases the main memory into which the representation of each object was loaded.

An embodiment of the present invention provides a computer-implemented method for geometrically transforming a plurality of objects represented within an object-oriented enterprise engineering system. At least one of the plurality of objects is a predecessor of another of the plurality of objects. The method involves a processor performing several operations, including accepting input from a user selecting the plurality of objects to be geometrically transformed, as well as accepting an indication of a type of geometric transformation that is to be performed on the selected objects. For each selected object, among the plurality of objects, any predecessor objects of the selected object are automatically identified. A value of at least one parameter of the selected object is functionally dependent on at least one parameter of the any predecessor objects. The selected objects are automatically divided into a plurality of ordered partitions of objects. For any given object, each of the object's predecessor objects is in the same partition as the given object or in a preceding partition.

The objects are geometrically transformed, according to the indication of the type of geometric transformation, per partition of objects, in partition order. While geometrically transforming the objects in a given partition, any successor object of each object in the partition is temporarily made read-only. Any predecessor object of each object in the partition is temporarily made read-only. For each object made temporarily read-only, a corresponding to-do item may be generated. If any of the temporarily made read-only objects is subsequently transformed, the corresponding to-do item may be deleted.

While geometrically transforming the objects in a given partition, any subordinate objects of the objects in the partition may be identified. The identified subordinate objects may be added to the partition, and the added subordinate objects may be geometrically transformed, according to the indication of the type of geometric transformation.

At least two of the partitions may be processed in partition order. The processing includes saving information about the partition and geometrically transforming the objects in the partition, according to the indication of the type of geometric transformation, before processing a subsequent partition. The saved information may include information sufficient to restart geometrically transforming the objects in the partition.

Automatically dividing the selected objects into a plurality of ordered partitions of objects may include generating a predecessor graph that relates each selected object to all the selected object's predecessor objects.

The method may include identifying at least one external object that is related to any of the selected objects and disconnecting the relationship between identified external object and the selected object.

Another embodiment of the present invention provides a system for geometrically transforming a plurality of objects represented within an object-oriented enterprise engineering system. At least one of the plurality of objects is a predecessor of another of the plurality of objects. The system includes a user interface configured to accept a first input from a user selecting a plurality of objects to be geometrically transformed and for accepting a second input from the user indicating a type of geometric transformation that is to be performed on the selected objects. An identification module is coupled to the user interface and is configured, for each selected object, to automatically identify any predecessor objects corresponding to the selected object. A value of at least one parameter of the selected object is functionally dependent on at least one parameter of the any predecessor objects. A partitioning module is coupled to the identification module and is configured to automatically divide the selected objects into a plurality of ordered partitions of objects. For any given object, each of the object's predecessor objects is in the same partition as the given object or in a preceding partition.

A transformation module may be coupled to the partitioning module and configured to geometrically transform the objects, according to the indicated type of geometric transformation, per partition of objects, in partition order.

A freezing module may be coupled to the transformation module and configured to, on a per-partition basis, temporarily make any successor object of each object in the partition read-only and temporarily make any predecessor object of each object in the partition read-only. The freezing module may be configured to generate a corresponding to-do item for each object made temporarily read-only.

A clean-up module may be coupled to the transformation module and configured to delete the corresponding to-do item, if any of the temporarily made read-only objects is subsequently transformed.

A propagation module may be coupled to the identification module and configured, for each partition, to identify any subordinate objects of the objects in the partition and add the identified subordinate objects to the partition. The transformation module is configured to geometrically transform the added subordinate objects, according to the indicated type of geometric transformation.

A process control module may be coupled to the transformation module and configured to process at least two of the partitions in partition order. The process control module may be configured, for each partition, to save information about the partition. The saved information includes information sufficient to restart geometric transformation the objects in the partition. The process control module may be configured to cause the transformation module to geometrically transform the objects in the partition, according to the indicated type of geometric transformation, before processing a subsequent partition.

The partitioning module may be configured to generate a predecessor graph that relates each selected object to all the selected object's predecessor objects.

A pruning module may be configured to identify at least one external object that is related to any of the selected objects and disconnect the relationship between the identified external object and the selected object.

Yet another embodiment of the present invention provides a computer program product for use on a computer system. The computer program product may be used for copying a plurality of predecessor and successor objects represented within an object-oriented enterprise engineering system. Each successor object has a predecessor relationship with a predecessor object. The computer program product includes a non-transitory computer-readable medium on which are stored computer instructions. When executed by a processor, the instructions cause the processor to accept input from a user. The input selects the plurality of objects to be geometrically transformed, and the input provides an indication of a type of geometric transformation that is to be performed on the selected objects. For each selected object, the instructions cause the processor to automatically identify, among the plurality of objects, any predecessor objects of the selected object. A value of at least one parameter of the selected object is functionally dependent on at least one parameter of the any predecessor objects. The instructions also cause the processor to automatically divide the selected objects into a plurality of ordered partitions of objects. For any given object, each of the object's predecessor objects is in the same partition as the given object or a preceding partition.

The instructions may cause the processor to geometrically transform the objects according to the indication of the type of geometric transformation, per partition of objects, in partition order.

The instructions may cause the processor to temporarily make any successor object of each object in the partition read-only and temporarily make any predecessor object of each object in the partition read-only.

For each object made temporarily read-only, the instructions may cause the processor to generate a corresponding to-do item. If any of the temporarily made read-only objects is subsequently transformed, the instructions may cause the processor to delete the corresponding to-do item.

While geometrically transforming the objects in a given partition, the instructions may cause the processor to identify any subordinate objects of the objects in the partition and add the identified subordinate objects to the partition. The instructions may cause the processor to geometrically transform the added subordinate objects, according to the indication of the type of geometric transformation.

BRIEF DESCRIPTION OF THE DRAWINGS

The invention will be more fully understood by referring to the following Detailed Description of Specific Embodiments in conjunction with the Drawings, of which:

FIGS. 5-13 illustrate aspects of an exemplary user interface to an embodiment of the present invention.

FIG. 18 is a more complete example of an XML class descriptor file, according to an embodiment of the present invention.

FIG. 25 is a schematic diagram of a value entry of the array of FIG. 24, according to an embodiment of the present invention.

FIG. 26 is a schematic diagram of a relationship entry of the transform graph data structure of FIG. 23, according to an embodiment of the present invention.

FIGS. 30-33 illustrate four hypothetical transactions to exemplify operation of an embodiment of the present invention.

DETAILED DESCRIPTION OF SPECIFIC EMBODIMENTS

Figure 1:
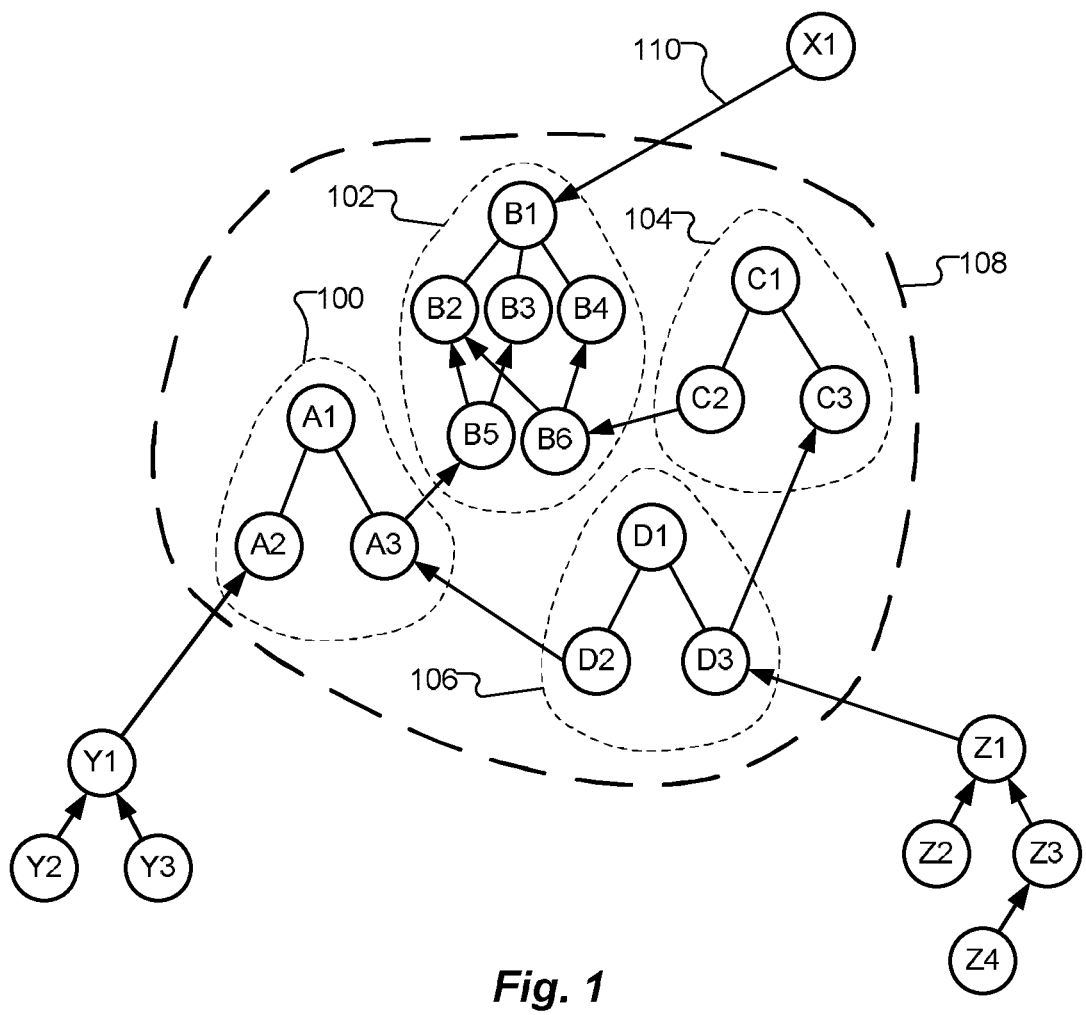
FIG. 1 is a schematic representation of a hypothetical set of objects and hypothetical relationships among the objects.

According to the present invention, methods and apparatus are disclosed for geometrically transforming, such as moving, rotating or mirroring, a large number of objects, while maintaining integrity of a model database, but without the memory constraints of the prior art. A large geometric transformation operation is divided into a number of smaller atomic operations (transactions) that are performed sequentially. Each small transaction geometrically transforms a selected subset of the objects that can be simultaneously represented in main memory of a computer, even if all the objects of the large geometric transformation do not simultaneously fit in the main memory. Thus, if a large geometric transformation operation is interrupted before all the small geometric transformation transactions have been completed, the model database is, nevertheless, left in a consistent state, and the overall geometric transformation operation may be resumed from the point of interruption.

According to embodiments of the present invention, a geometric transformation of a large group of objects is performed in two passes. During a first pass, relationships between objects that are to be transformed and objects that are not to be transformed, referred to herein as "external relationships," are disconnected. This leaves a number of objects that are all to be transformed alike, i.e., all moved, all rotated or all mirrored, etc. by equal amounts. During a second pass, the objects are geometrically transformed.

Relationships among the objects that are all to be transformed are referred to herein as "internal relationships." Although disconnecting the external relationships during the first pass may require recalculating functional dependencies defined by these external relationships, once this has been done, the remaining objects can be transformed without recalculating functional dependencies defined by the internal relationships, because all of the objects are geometrically transformed by equal amounts. Therefore, the location of a geometrically transformed object does not change, relative to the other geometrically transformed objects. They are all moved, rotated, mirrored, etc. together and by equal amounts.

For example, if a beam and a column are both geometrically transformed together, the positions of the beam and the column are changed by equal amounts by the geometric transformation. However, the position of the beam does not change, relative to the column. Consequently, the functional dependency of the position of one on the other does not need to be recalculated. Recall that if one of the beam or column is moved, relative to the other, the functional dependency must be recalculated, because the position of one is changed, relative to the other.

Generally, there are fewer external relationships than internal relationships. Therefore, although some functional dependency recalculations need to be performed during the first pass, i.e., for the severed external relationships, once the external relationships are disconnected, no functional dependency recalculations need to be performed on the objects during the second pass, i.e., for the internal relationships. The two-pass approach therefore provides a significant performance improvement over the prior art, which does not sever the external relationships and, consequently, requires functional dependencies for all relationships to be recalculated.

I recognized that the order in which objects are geometrically transformed is important. I begin my description with FIG. 1, which schematically represents a number of hypothetical objects A1, A2, A3, B1, . . . Z4 and relationships (represented by solid lines) between pairs of the objects A1-Z4. FIG. 1 shows a relatively small number of objects for simplicity of explanation. Objects A1, B1, C1 and D1 represent design objects. A design object may be made up of zero or more subordinate objects. For example, objects C2 and C3 are subordinate objects of the design object C1. Each collection of subordinate objects forms a hierarchy descending from its respective design object. Each design object and its respective subordinate objects are enclosed by a respective light dashed line 100, 102, 104 or 106.

Functional Dependencies

Some pairs of the objects A1-Z4 are in functionally dependent relationships, as indicated by arrows. For example, object B6 depends from object B4. This means the value of at least one parameter of object B6 depends on the value of at least one parameter of object B4. Thus, if the value of a parameter of object B4 changes to a changed value, the value of one or more parameters of object B6 should be recomputed based on the changed value of the parameter(s) of object B4 and an engineering relationship between the objects. Thus, at least with respect to the relationship between objects B4 and B6, object B6 is referred to as being "dependent," and object B4 is referred to as being "independent." Note that some functional relationships cross design object boundaries. For example, object A3, which is part of design object A1, is functionally dependent on object B5, which is part of a different design object B1.

The fact that subordinate object A3 is dependent on object B5 implies that design object B1 is a "predecessor" (as that term is used herein) of design object A1, even though there is no explicit relationship between design objects A1 and B1. As used herein, a predecessor object is a design object, upon which another design object depends. That is, the dependent design object or one or more of its subordinate objects depends on the predecessor design object or one or more of its subordinate objects. Thus, if a value of a parameter of the predecessor design object or one or more of its subordinate objects changes to a changed value, the value(s) of one or more parameters of the dependent design object or one or more of its subordinate objects should be recomputed. The implied relationship between design objects A1 and B1 is induced by the actual relationship between the subordinate objects A3 and B5. Design objects can, however, have explicit relationships (not shown) with other design objects.

It should be noted that a predecessor relationship is completely different than a parent-child (a.k.a. class-subclass or generalized hierarchy or class-instance) relationship from the object-oriented programming paradigm. A subclass inherits attributes, such as variables and methods, from its superclass. Similarly, an instance inherits attributes from its class definition. Typically, a subclass adds functionality, such as additional variables or methods, although in some cases the subclass overrides variables and/or methods of its superclass. For example, a class may be defined for "vehicle," which includes variables for "weight" and "number of wheels" and might include a method for "accelerate," which takes as an input a distance a gas pedal has been depressed. Instances of the class may be objects that represent various cars and trucks. A subclass may be defined for "crane," which might add variables for "max_lift_weight" and "max_lift_height" and possibly methods that can be invoked to perform functions, such as raising or lowering a load.

Predecessor relationships are unrelated to class-subclass relationships. Predecessor relationships are not known from the object-oriented paradigm; they were conceived by the inventor of the present Application for purposes described in the Application. A predecessor relationship does not imply inheritance. Functional dependencies are not inheritances. A predecessor object does not automatically inherit properties (variables) or methods from its dependent object, or vise-versa, as a result of being a predecessor object. Instead, if a value of a parameter of a predecessor design object or one or more of its subordinate objects changes, the value(s) of one or more parameters of the dependent design object or one or more of its subordinate objects should be recomputed.

Objects in predecessor relationships are not necessarily in class-subclass relationships. Typically, predecessor objects are in neither subclasses nor superclasses of their successor objects. For example, pumps and pipe runs are typically in entirely different classes, as are beams and columns. Furthermore, a subclass/superclass relationship does not imply a functional relationship. That is, if an object of one class is altered (such as by being moved to a new location), objects in its subclasses and superclasses do not need to be recalculated.

Assume the design objects A1, B1, C1 and D1 are selected for transformation. The objects that are to be transformed are enclosed by a heavy dashed line 108. Note that some objects, such as objects X1, Y1 and Z1, are related to objects that are to be transformed, but that objects X1-Z4 are not selected for transformation.

If the objects within dashed line 108 were geometrically transformed in an arbitrary order, and the geometric transformation operation were abnormally terminated, the database might be left in an inconsistent state, because some dependent objects might be geometrically transformed, but the objects from which they depend might not be transformed, by the time the transformation operation abnormally terminates.

Furthermore, the number of objects selected for transformation, and their subordinate objects, may exceed main memory, i.e., real or virtual memory, of the computer that is to perform the geometric transformation. That is, the main memory may be insufficient to simultaneously store representations of the objects to be geometrically transformed.

Partitions

In accordance with my methods and apparatus, objects are divided into ordered sets (also referred to as "partitions") of selected objects according to certain rules, and the partitions are processed in sequential order in each of two passes. To process an object, for example to disconnect a relationship or move, rotate or mirror the object, a representation of the object must be in main memory. Once the representation has been loaded from the database into main memory, values in the representation can be changed to effect the change in relationship or geometric processing.

As noted, for large groups of objects to be geometrically transformed, it may not be possible to simultaneously store all the objects' representations in main memory. According to embodiments of the present invention, only a subset of these representations is loaded from the database into memory at a time. The object memberships and order of processing of the subsets are defined by the partitions. Consequently, the number of objects that can be geometrically transformed is not limited by the size of main memory.

As discussed above, during the first pass, external relationships are disconnected. During the second pass, the objects in the partitions are geometrically transformed. During each pass, the partitions are processed in sequential order. Processing the partitions in sequential order during a pass means all the objects of a partition are processed before any of the objects in any subsequent partition are processed. For example, during the second pass, all the objects of a partition are geometrically transformed before any of the objects in any subsequent partition are transformed. The objects are assigned to partitions, such that dependent objects are transformed no earlier than the objects from which they depend are transformed. As described herein, an object's dependencies can be determined by querying the database, but without necessarily loading the object into main memory.

Figure 2:
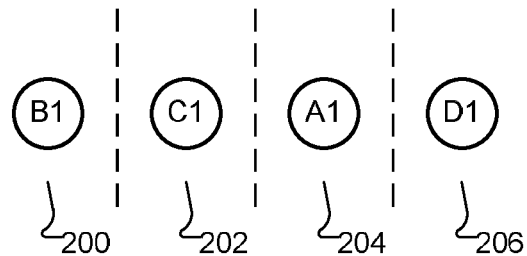
FIG. 2 is a schematic representation of design objects of FIG. 1, sorted and partitioned in preparation for geometric transformation, according to an embodiment of the present invention.

FIG. 2 shows an exemplary division of the design objects A1-D3 into ordered partitions 200, 202, 204 and 206, according to my rules. For example, design object D1 and its subordinate objects (i.e., partition 206) are not transformed until the objects represented by partition 202 (design object C1 and its subordinate objects) and partition 204 (design object A1 and its subordinate objects) have been transformed, because design object D1 (or at least one of its subordinate objects) depends on an object in partition 202 and an object in partition 204. A "successor partition" is a partition that contains an object that depends on an object in another partition. For example, partition 206 is successor partition to each of partitions 202 and 204. A "predecessor partition" is a partition that contains an object, upon which another object in another partition depends. For example, partition 204 is a predecessor partition to partition 206.

Each partition 200-206 is transformed in a corresponding distinct transaction. That is, for each partition 200-206, a transaction is performed, and all the design objects within the partition and their respective subordinate objects are transformed during the transaction. The example shown in FIG. 2 includes only one design object per partition 200-206, which I prefer; however, a partition may include more than one design object. Transforming the objects in a partition is also referred to as "transforming the partition." As noted, the partitions are transformed in sequential order. For example, partition 202 is transformed after partition 200.

Each partition of objects is geometrically transformed in an atomic operation (transaction), which leaves the database consistent, even if the large geometric transformation operation abnormally terminates. If a large geometric transformation operation is abnormally terminated, the transformation operation may be resumed at the point where it terminated. For example, if a hardware failure caused the abnormal termination, the transformation operation may be resumed after the failure has been rectified. In another example, if some of the objects that are to be transformed are marked as "read-only" in the database, the transformation operation may be restarted after these objects' protections have been modified to permit altering these objects' parameters, i.e., making these objects "read-write." Furthermore, a very large number of objects can be geometrically transformed, without regard to the amount of available memory, by dividing the objects into sufficiently small partitions, because only a relatively small number of objects need to be loaded into memory at a time. The objects that need to be loaded into memory include: objects from the current partition, objects from any predecessor partition(s) and objects from any successor partition(s). Once the geometrically transformed objects are committed to the database, the memory may be reused.

To support restarting a large geometric transformation, information about the transformation is stored in the database, essentially as a "transformation operation object." The status of each partition's transformation transaction is also stored in the transformation operation object. Thus, if a geometric transformation operation needs to be restarted, information about which partitions have already been transformed, as well as information about which partitions have not yet been transformed, is available, so the transformation operation can resume where it left off.

External Relationships

As noted, an "external relationship" is one that crosses a boundary between objects that are to be transformed and objects that will not be transformed. For example, in FIG. 1, any relationship that crosses the heavy dashed line 108 is an external relationship, regardless of any functional dependency between the related objects. In FIG. 1, object X1 is dependent upon object B1. However, object X1 is not selected for transformation. Thus, the relationship 110 between objects B1 and X1 is an external relationship. If the dependent object (in this example, X1) can exist without a relationship to its independent object (in this example, B1), the external relationship is broken (i.e., the objects are disconnected from each other), and, in one embodiment, the dependent object (X1) becomes independent. On the other hand, in this embodiment, if the dependent object (X1) cannot exist without a relationship to its independent object (B1), the dependent object (X1) is deleted.

Which objects can exist without relationships is domain specific. That is, a designer of the enterprise engineering system determines which relationships are external relationships. For example, systems of pipes are made out of pipe runs. A pipe run is a design object. Therefore, a pipe run is the smallest unit of piping that can be transformed with the multi-transaction method. A pipe run can be made up of multiple logical "features," such as straight features, turn features, along-leg features, branch features, etc. Each feature can correspond to a physical part, such as a straight pipe, an elbow, a valve or a tee component. The physical parts that are adjacent one another are related to each other by means of connection objects. Connection items, such as welds or gaskets, can be associated with each connection. Thus, a single pipe run may have many features, parts, connections and connection items. The relationships between the pipe run and these objects may be internal relationships. For example, if a pipe run is transformed (such as moved), all these objects may be transformed (moved) along with the pipe run.

On the other hand, a first pipe run can also be connected to a second pipe run or to a nozzle on a piece of equipment. The relationships between members of the first pipe run and members of the second pipe run or equipment may be external relationships. In this case, if the first pipe run is transformed (such as moved), the external objects need not be transformed. For example, if the first pipe run is moved, the relationship to the second pipe run or the equipment is identified as an external relationship. Because the second pipe run (and the equipment) can exist as an independent object, the relationship can be broken.

Architectural Overview

Figure 3:
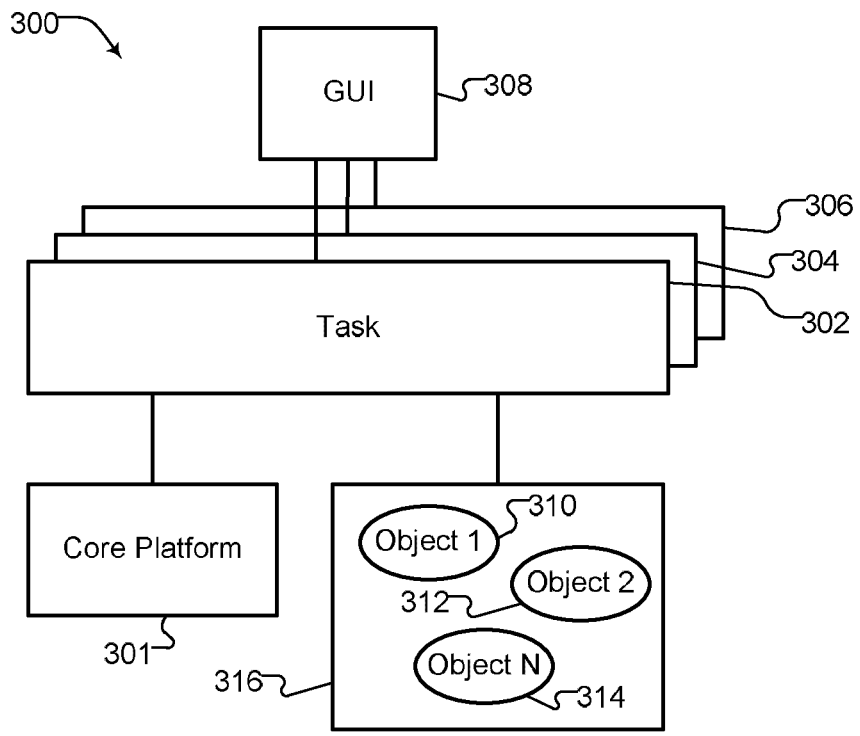
FIG. 3 is a schematic block diagram of a modular enterprise engineering system, according to an embodiment of the present invention.

The methods and apparatus described herein for geometrically transforming objects may be implemented in a variety of contexts, such as an enterprise engineering system. A modular exemplary enterprise engineering system 300 is schematically illustrated in FIG. 3. A core software platform 301 provides common services (i.e., services to one or more tasks), including geometric transformation, used in relation to a variety of design objects. The core platform 301 may provide other common services, such as copying groups of objects, as described in commonly-assigned U.S. Pat. No. 8,793,218, the entire contents of which are hereby incorporated by reference for all purposes. Other examples of common services may include transaction management, graphic display, edit and undo operations, revision management and DBMS interface. All design objects share a common three-dimensional workspace provided by the core platform 301.

One or more software tasks, exemplified by tasks 302, 304 and 306, make calls to the core platform 301 and provide problem domain-specific services to users via a graphical user interface (GUI) 308. Exemplary software tasks include tasks that implement structural systems, electrical systems, equipment systems and piping systems. Each task 302-306 includes its own set of menus, its own set of objects and relationships and its own set of functional dependencies. Of course, some types of relationships can cross the boundary from objects of one task 302-306 to objects of another task 302-306. Each task 302-306 implements objects, exemplified by objects 310, 312 and 314, that are appropriate for the task's needs. The objects 310-314 may be stored in a relational database (RDB) 316 or another suitable database. The software architecture shown in FIG. 3 facilitates adding new tasks to an enterprise engineering system without impacting existing tasks.

High-Level Operations Overview

Figure 4:
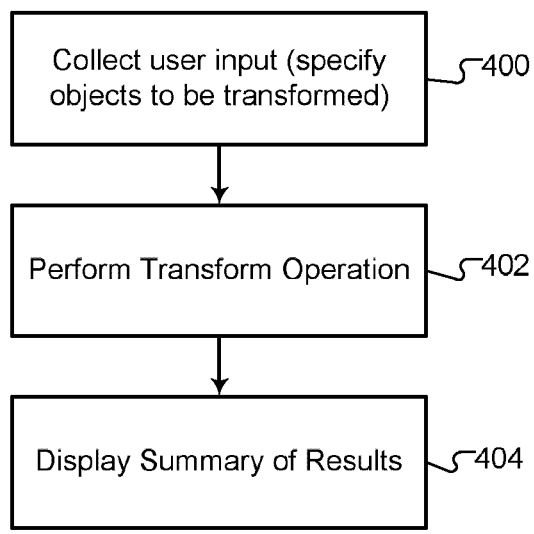
FIG. 4 is a flowchart illustrating overall operation of an embodiment of the present invention.

FIG. 4 contains a high-level flowchart illustrating major operations performed by the core platform 301 (FIG. 3) to geometrically transform one or more objects. Each of these operations is summarized here and described in more detail below. At 400, user input is collected to specify the objects to be transformed, as well as the type(s) of transform(s) (such as move, rotate and/or mirror) to be performed on the objects and parameters of the transformation (such as distance to move, angle of rotation, center of rotation and/or axis for mirroring, as the case may be). The user interface 308 (FIG. 3) may allow the user to select objects from a menu of choices or to enter or select filter criteria, which the system then uses to automatically select objects that satisfy the criteria.

Alternatively, the user interface may provide a graphical selection tool, such as a selection cursor or a "rubber band" selection rectangle (or other shape), or any other suitable selection metaphor. Aspects of an exemplary "wizard" style user interface for prompting the user and for accepting the user's inputs are described below, with reference to FIGS. 5-12. At 402, the transformation operation is performed, as described in detail herein. At 404, a displaying of information about a transformation operation is presented to the user. An exemplary summary display is shown in FIG. 13.

User Interface to Collect User Input Specifying Objects to be Transformed

Figure 5:
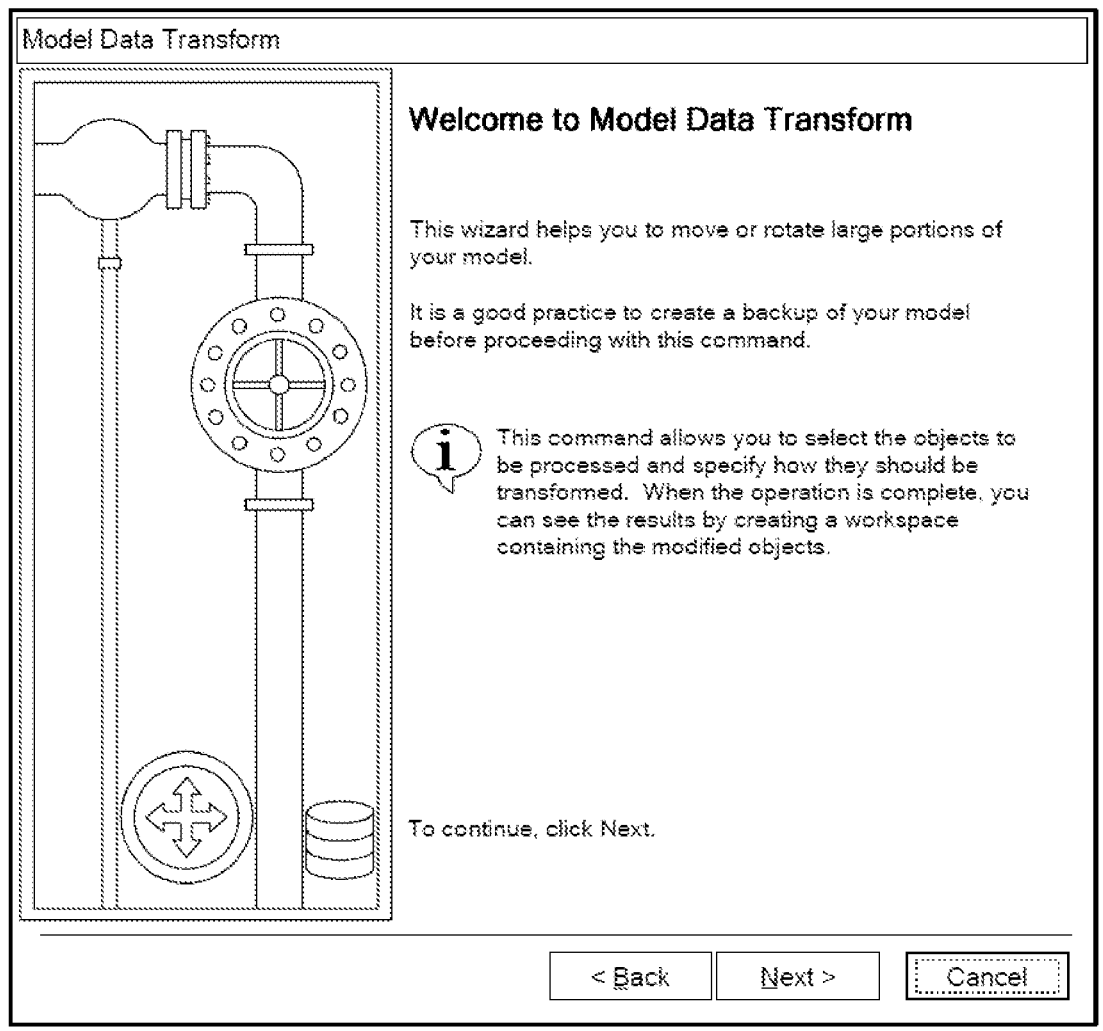

As noted with respect to the flowchart of FIG. 4, user input is collected (400) to specify the objects to be transformed. Aspects of an exemplary "wizard" style user interface for prompting the user and for accepting the user's inputs and displaying information about a transformation operation are described below, with reference to FIGS. 5-13. FIG. 5 illustrates an exemplary dialog box that introduces the model data transform system wizard.

Using a dialog box shown in FIG. 6, the system may accept user inputs that select a portion of an existing model that is to be copied. As used in the exemplary dialog box, the term "plant" refers to a database. Thus, in the example shown in FIG. 6, the user has selected a source "plant" 600 (i.e., a database) named "SDH_9059_ModelA." Each database stores information about a model in a hierarchy of "systems." Exemplary systems include structural systems (which may include objects such as footings, beams and columns), electrical systems (which may include conduit, wire runs, switches and the like), equipment systems (which may include pumps and tanks) and piping systems (which many include pipes, elbows, T-connections, valves and the like). The granularity of the hierarchy depends on the particular enterprise engineering system being used and user requirements.

As noted, an enterprise engineering system may include design objects that are exposed to a user through a user interface, as well as other objects that are not exposed. For example, the system may expose design structural objects, such as footings, columns and beams. The user may manipulate these design objects through the user interface. For example, the user may move a column or specify its dimensions. The system may use the unexposed subordinate objects to store information about the exposed objects. For example, an I-beam design object may be related to subordinate objects representing the primary axis of the I-bean, its cross section, logical connection ports, etc.

FIG. 7 illustrates a dialog box that accepts user inputs to select between beginning a new transformation operation 700 and continuing or restarting a previously-started (existing) transformation operation 702. If a new operation 700 is to be begun, the user may name the operation 704 and specify a permission group 706. On the other hand, if an existing operation is to be restarted 702, the user may select a previously-started transformation operation, such as by its name, from a selector box 708.

Figure 8:
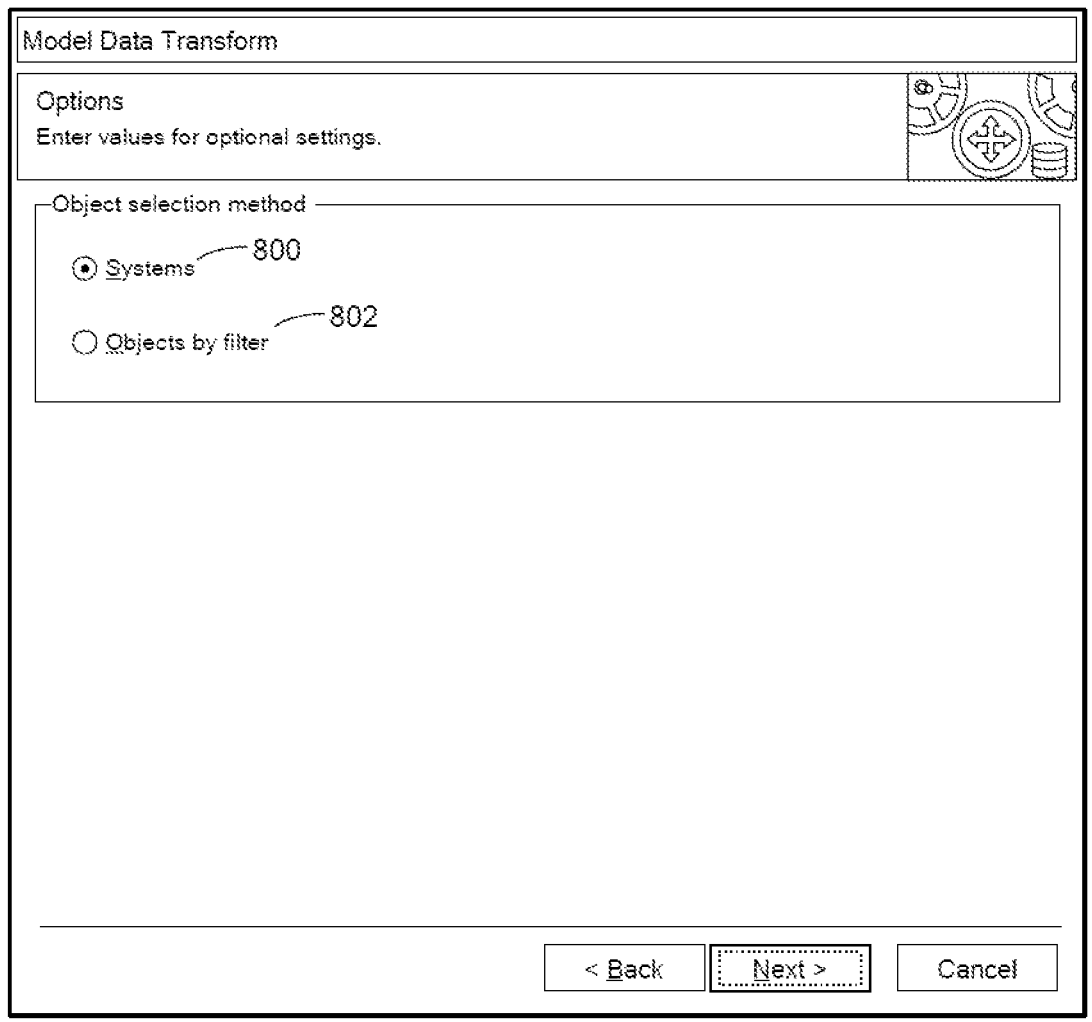
Figure 9:
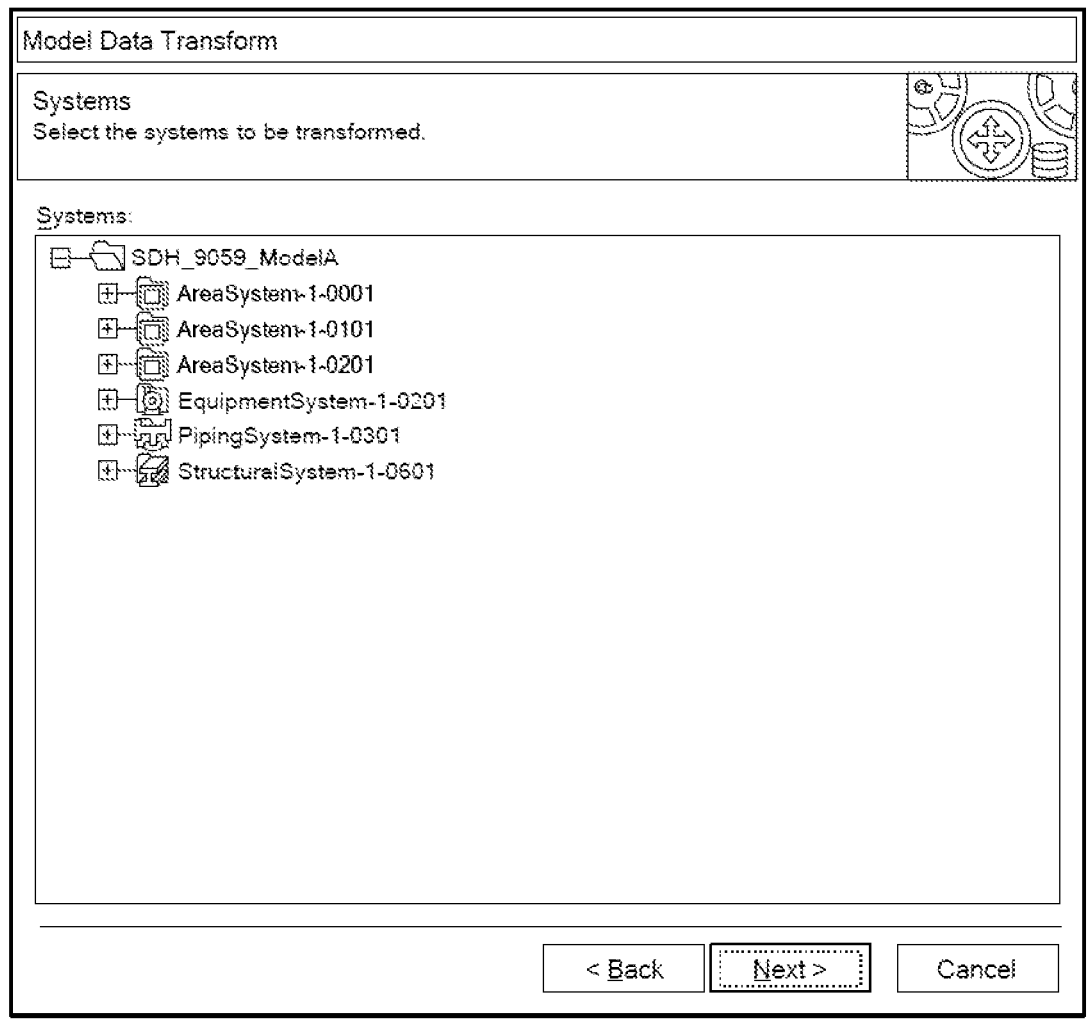

FIG. 8 illustrates a dialog box that allows a user to select objects to be transformed, based on which system they belong to 800 or based on a filter 802. If the objects are to be selected by system, FIG. 9 illustrates a dialog box that allows a user to select the system to be transformed.

Figure 10:
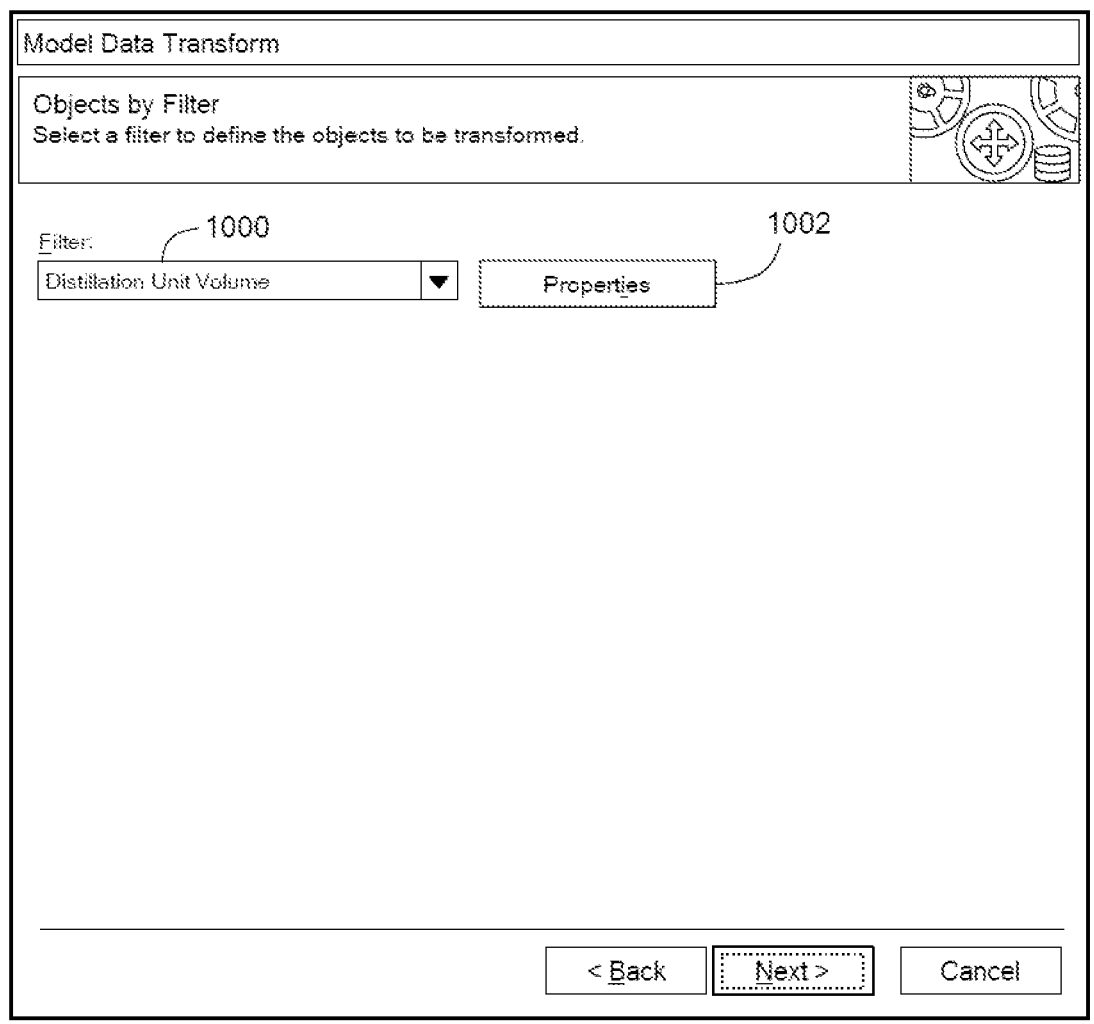

On the other hand, if the objects are to be selected by a filter 802 (FIG. 8), FIG. 10 illustrates a dialog box that allows a user to select a predefined filter 1000 and optionally modify the filter's criteria 1002 or specify criteria for a new filter. Filters may be implemented by queries of the database 316 (FIG. 3). Exemplary filters include: a "volume" filter (which represents a query based on the geometric location of design objects, i.e., objects within a specified three-dimensional volume or a two-dimensional area are selected) and a "property" filter (which represents a query based on one or more values of properties, such as size, weight-bearing capacity, composition or name of design objects). More complex filters may created by combining filters with Boolean operators, such as "AND" and "OR." Preferably, the query is performed without binding the selected objects into memory. Instead, the query returns a list of object identifiers (OIDs). An OID is a number, string, database key or other quantity that uniquely identifies an object and that may be used to fetch the object from a database into memory (referred to as "binding" the object).

FIG. 11 illustrates a dialog box that accepts user inputs to specify transformations that are to be applied to the selected objects. For example, the objects may be moved 1100 a user-specified number of units in three orthogonal directions 1102, 1104 and 1106. A user may specify the unit of measure in 1108. Other types of transformation may optionally or alternatively be selected. For example, the user may select to rotate 1110 the selected objects or to move and rotate 1112 the selected objects. Other types of transformations, such as mirroring about an axis (not shown), may be presented as options to the user. If the user elects to perform the operation, a transformation operation object is created to keep track of information about the transformation and status of each transaction, into which the transformation will be divided.

Figure 12:
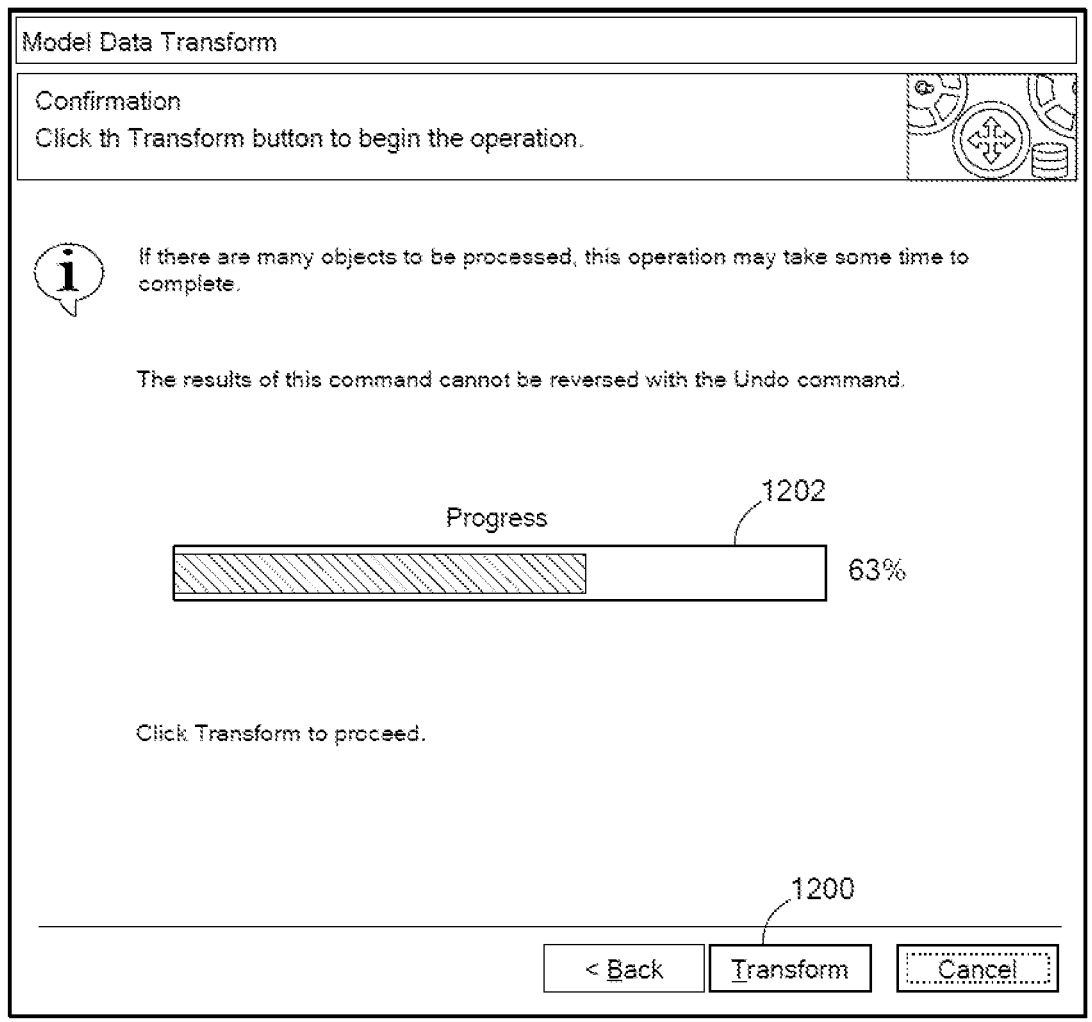
Figure 13:
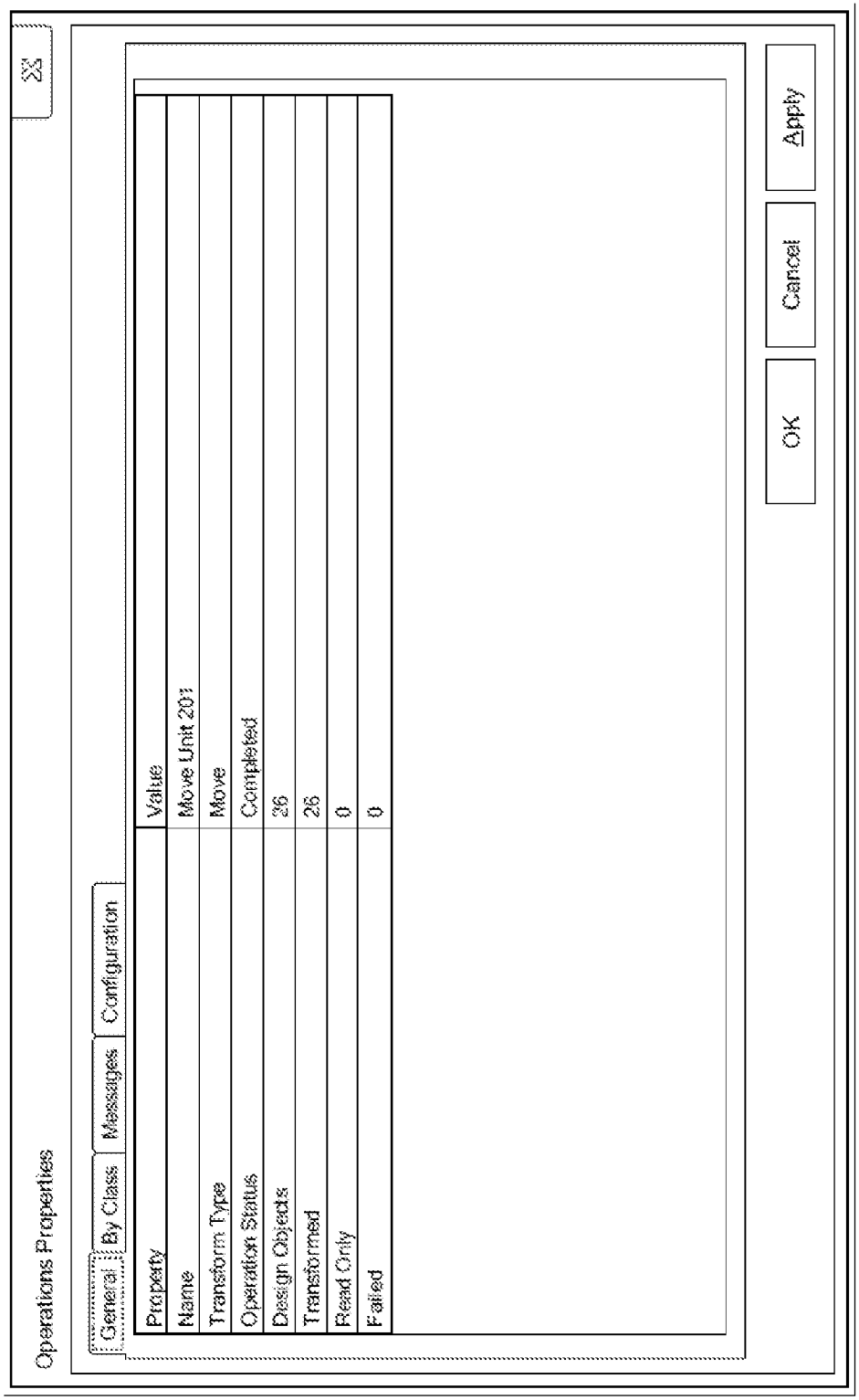

FIG. 12 illustrates a confirmation dialog box. Once the user initiates 1200 the transformation operation, the system may display a progress indicator 1202. After all the partition transformation operations complete successfully, or if the transformation operation is abnormally terminated, a results dialog box may be displayed to the user to report status, as shown in FIG. 13. As noted, a transformation operation may take minutes, hours or longer to complete.

Transforming the Partitions

Figure 14:
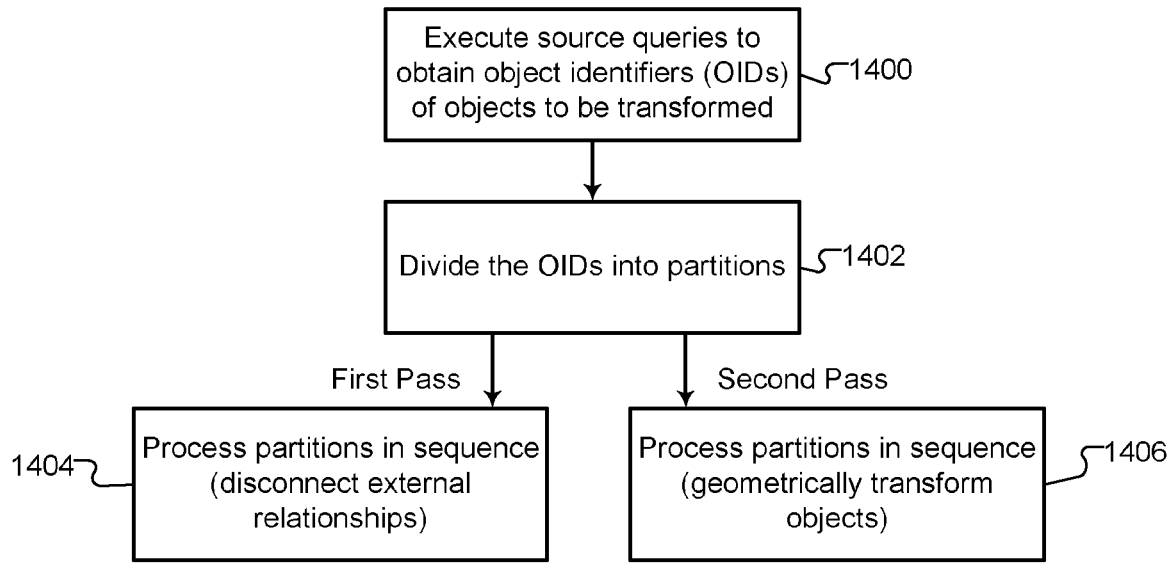
FIG. 14 is a high-level flowchart illustrating sub-operations of a transformation operation of FIG. 4.

As noted with respect to FIG. 4, once the user input has been collected to specify the design objects to be transformed 400, the transform operations may be performed 402. FIG. 14 is a high-level flowchart illustrating sub-operations of the transformation operation 402 (FIG. 4). At 1400, the database 316 (FIG. 3) is queried to obtain object identifiers (OIDs) of the design objects that are selected by the user for transformation. As noted above, with respect to FIGS. 8-10, the query is performed without binding the selected objects into memory. At 1402, the list of OIDs is divided, according to my rules, into ordered partitions, as described in more detail herein, such as with reference to a flowchart in FIG. 15. At 1404, the ordered partitions are processed in sequence, in a first pass, to disconnect external relationships. At 1406, the ordered partitions are again processed in sequence, in a second pass, to geometrically transform the objects of the partition, as described in more detail herein, such as with reference to a flowchart in FIG. 21.

Figure 15:
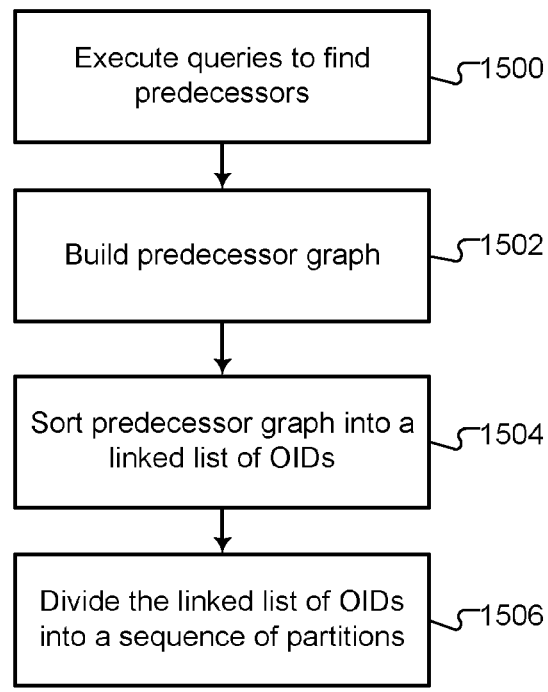
FIG. 15 is a flowchart illustrating operations to divide the list of object identifiers (OIDs) into ordered partitions, expanding on an operation of FIG. 4.

FIG. 15 is a flowchart illustrating operations to divide the list of OIDs into ordered partitions. Processing to divide a list of OIDs into partitions may be performed before the two passes. At 1500, the database 316 (FIG. 3) is queried to identify all predecessor objects for each design object that was selected for transformation. As noted, a predecessor object is a design object, upon which another design object depends. That is, the dependent design object or one or more of its subordinate objects depends on the predecessor design object or one or more of its subordinate objects. At 1502, a predecessor graph (data structure) is built to organize the identified predecessor objects, and then the predecessor graph is sorted to generate a linked list of OIDs at 1504. The linked list of OIDs is divided at 1506 into a sequence of ordered partitions. A more detailed description of operations 1502-1506 follows.

Predecessor Graph

In one embodiment, predecessor objects are identified by constructing a directed graph (a "predecessor graph") that relates each design object that is to be transformed to its predecessors. The predecessor graph includes a node for each design object that is to be transformed. Each node stores an OID for the respective object. Directed edges of the graph represent relationships between respective object nodes. The collection of edges originating at a node identifies all of the predecessor nodes. Similarly, the collection of edges terminating at a node identifies the successor nodes. The objects identified by predecessor nodes should all be transformed before the object identified by the current node.

A traversal of this graph yields an ordered list of objects to be transformed. Sets of consecutive objects from this ordered list are assigned to successive partitions, which are transformed as described herein. All the design objects to be transformed are thus divided into a sequence of partitions. These operations will now be described in detail.

If two design objects are unrelated to each other, the order in which the objects are transformed is irrelevant. However, a relationship between the two design objects may indicate precedence exits between the objects. The relationship may be between one of the design objects or a subordinate object under the design object and the other design object or a subordinate object under the other design object.

As noted, a design object that is selected for transformation often has subordinate objects that should be transformed along with the selected object. For example, a beam object may have several unexposed (to the user) subordinate connection objects or other subordinate objects. In addition, the beam object may be connected to a predecessor column object, which is exposed to the user. The connection may be made through an unexposed subordinate connection point object related to the column object. As noted, collectively, a design object and its related subordinate objects are referred to as a "design object group" or simply a "group."

Figure 16:
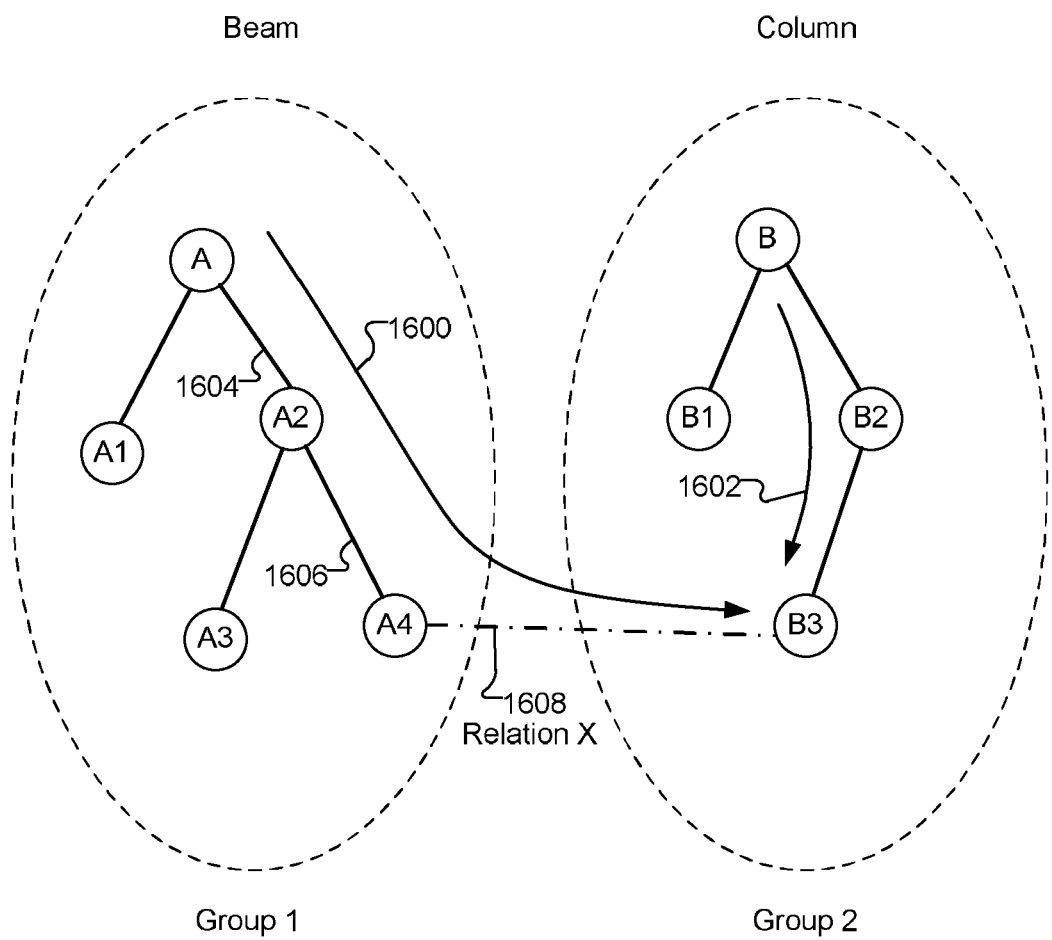
FIG. 16 is a schematic diagram of two design objects and corresponding respective subordinate objects, according to an embodiment of the present invention.

A graphical representation of such a situation is depicted in FIG. 16. Group 1 represents the beam object, and Group 2 represents the column. The design beam object A is related to a number of subordinate and/or exposed objects A1, A2, A3 and A4, all of which should be transformed along with the exposed beam object A. Assume the object A4 represents a connection point on the beam. Similarly, the design column object B is related to a number of subordinate and/or exposed objects B1, B2 and B3. Assume the object B3 represents a connection point on the column, and that a Relationship X represents the connection between the connection points A4 and B3 on the beam and the column, respectively.

The connection object B3 is referred to as a "target" object, because a relationship can be established from another object to the connection object B3. If such a relationship were to be established, the column object B would become a predecessor, and the other design object would become a successor, for purposes of transforming the objects. An object may have more than one target. In addition, relationships other than physical connections may be established. For example, an object may be related to a coordinate system object or to a unit of measurements object. Similarly, an object, such as a beam, may have more than one object through which the object may be related to another object.

As noted, an enterprise engineering system typically includes one or more software tasks 302-306 (FIG. 3) that manage the systems within a plant or a model. These software tasks create objects in response to user inputs, such as when a user adds a beam or a column to a model. In the object-oriented paradigm, a "class" is a definition or prototype of an object. Object-oriented systems have class definitions for each type of object that may be created.

The type of relationship, the objects between which the relationship exists and the meaning, in terms of precedence, are all specific to each software task 302-306. Each task 302-306 supplies information about its design classes in the form of metadata. This metadata allows the core platform 301 to perform queries on the database 316 to find predecessors for each object in the list of objects that are to be transformed.

In accordance with the present invention, each class definition provides information that enables the core platform 301 to traverse two types of paths, relative to the objects: (a) a path from the object, through the internal relationships of its own group, to a target object in another object, with which the object could have a relationship and (b) a path from the object, through the internal relationships of its own group, to a target within its own group, i.e., to a target object through which a relationship may be established to this object. From this information, paths to all targets in predecessor objects may be determined, as well as paths to all possible targets within its own group of subordinate objects. Each path includes a sequence of directed relationships.

The two types of paths are exemplified in FIG. 16. As noted, the beam may be connected to another design object, and the beam's connection object A4 is the object where the connection relationship (Relationship X) would be established. As noted, other of the beam's objects A1-A4 might also be objects through which relationships may be established. Because object A4 can be used to establish a relationship with another object, path 1600 is an example of the first type of path, i.e., a path from the object A, through the internal relationships of its own group of objects, to a target object B3 in another object group, with which the object A could have a relationship (Relationship X). Path 1602 exemplifies the second type of path, i.e., a path from an object B, through the internal relationships of its own group, to a target B3 within the group. The existence of Relationship X indicates that design object B is a predecessor of object A, so object B should be transformed before object A.

In some embodiments, each class definition provides a "class descriptor" file that includes information that a transformation application may use to identify one or both of the two types of paths, depending on whether objects of the class can be targets or the objects can have relationships established to other objects. In some embodiments, this file is formatted according to the extensible markup language (XML) specification. A more detailed description of such an XML file appears below.

As noted, a typical enterprise engineering system stores information about objects and relationships in a relational database (RDB) or in another type of database. Some such systems maintain separate database tables for each type of object. For example, such a system may maintain a table for column objects and a separate table for beam objects. Information about relationships between objects may be maintained in the object tables or in separate tables. For example, a table of relationships, exemplified by Table 1, may record a pair of objects and a relationship between the objects in each row of the table. Thus, for each relationship between two objects in the system, the table contains one row. Table row fields may contain object identifiers (OIDs). The nomenclature "OID (B)" means the "object identifier of object B." The relationship shown in the second row of Table 1 corresponds to Relationship X shown in FIG. 16, indicating that the connection point A4 on the beam A is an end-to-mid connection to point B3 on column B.

TABLE 1

| Origin  | Destination | Relation Type        |
|---------|-------------|----------------------|
| OID (X) | OID (Y)     | End-to-end connection |
| OID (A4)| OID (B3)    | End-to-mid connection |

As indicated by the column headings ("Origin" and "Destination") in Table 1, relationships are directed. The direction of a relationship may, but need not, imply a successor/predecessor relationship between the two corresponding objects.

Figure 17:
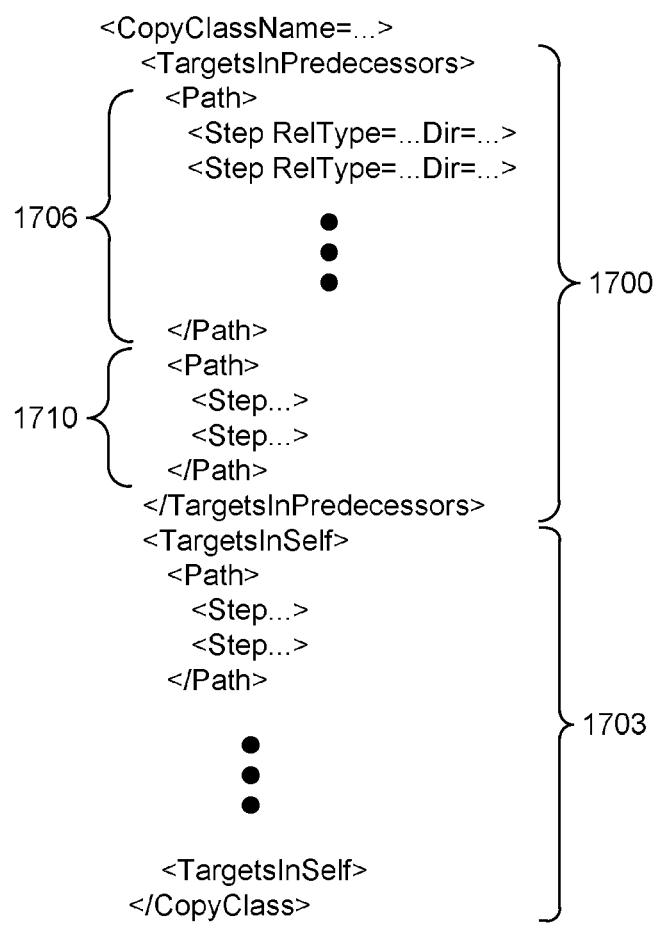
FIG. 17 contains an exemplary XML file fragment for providing class information to enable traversal of relationship paths, such as in the objects of FIG. 16, according to an embodiment of the present invention.

As noted, each class definition provides a class descriptor file containing information that enables software to traverse the two types of paths, relative to the objects instantiated according to the class. FIG. 17 contains an exemplary XML file fragment for providing this information. Other suitable file formats may also be used.

For a given class of objects, the file contains two portions 1700 and 1703 that provide information about the two types of paths, respectively. The first portion 1700 ("TargetsInPredecessors") provides information about each possible path from the object, through the internal relationships of its own group of subordinate objects, to a target object in another object, with which the object could have a relationship, i.e., to an object that would be a predecessor of the object.

The example shown in FIG. 17 defines two such paths 1706 and 1710. Each path includes at least one "step." A step describes a relationship between two objects, including a description of the relationship type (RelType) and a direction of the relationship (Dir). Using the beam object of FIG. 16 as an example, the path 1600 would be described as having three steps, corresponding to the relationships 1604, 1606 and 1608. Starting at the object, any path that matches the number of specified step(s), the specified relationship type(s) (RelType) and the specified direction(s) (Dir), qualifies as a TargetsInPredecessors path.

Returning to FIG. 17, the second portion 1703 ("TargetsInSelf") of the XML file provides information about each possible path from the object, through the internal relationships of its own group, to a target within the group. FIG. 18 is a more complete example of an XML class descriptor file.

When an object is selected by a user or automatically identified by the system as an object to be transformed, the system automatically identifies predecessors of the corresponding design object. To identify the predecessors, the system identifies target objects in the predecessors, to which the selected object, or one of its subordinate objects, is related. To identify the target objects, the system builds a query for each TargetsInPredecessors path defined for the object class. The query starts with the OIDs of all design objects for the given class that are to be transformed and contains a JOIN for each step of the path. The query is executed against the relationship table in the database 316 (FIG. 3). The query results in a table containing OID pairs. Each pair of OIDs includes an OID of an object to be transformed, such as the beam (OID "A"), and an OID of a target object, such as the connection point (OID "B3"). Table 2 illustrates a portion of an exemplary result of such a query.

TABLE 2

| OID of Object to be Transformed | OID of Target Object |
|---------------------------------|----------------------|
| A                               | B3                   |

The system also builds a query for each TargetsInSelf path defined for the object class. The query starts with the OIDs of all design objects for the given class that are to be transformed and contains a JOIN for each step of the path. The query is executed against the relationship table in the database 316 (FIG. 3). The query produces a table containing pairs of OIDs. Each pair of OIDs includes an OID of an object to be transformed, such as the column (OID "B"), and an OID of a target object, such as the connection point (OID "B3"). Table 3 illustrates a portion of an exemplary result of such a query.

TABLE 3

| OID of Object to be Transformed | OID of Target Object |
|---------------------------------|----------------------|
| B3                              | B                    |

The above-described queries are executed for each class of object that is selected for transformation, and the results of the queries are accumulated in the two resulting tables. The two tables are then joined on the table column named "OID of Target Object" to produce a third table. Table 4 illustrates a portion of an exemplary result of such a database JOIN operation. The rows of Table 4 represent predecessor relationships among the objects that are to be transformed. For example, according to the first row of Table 4, object B should be transformed no later than object A, because object B is a predecessor of object A.

TABLE 4

| OID of Object to be Transformed | OID of Predecessor Object |
|---------------------------------|---------------------------|
| A                               | B                         |

As noted, a predecessor graph includes a node for each design object that is to be transformed, and edges of the graph represent relationships between the respective object nodes. The system creates a node in this graph for each design object selected by the user. In addition, the system adds an edge to this graph for each design object that is identified as a predecessor in the Table 4.

Figure 19:
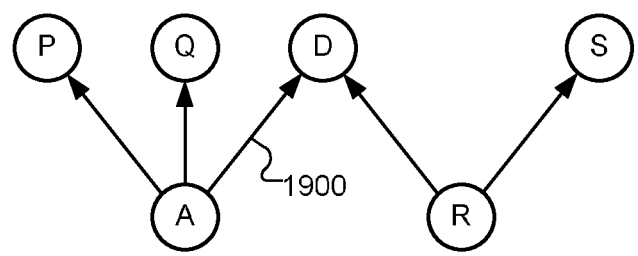
FIG. 19 illustrates an exemplary predecessor graph, according to an embodiment of the present invention.

Each row of the joined table (Table 4) represents a predecessor relationship between an object that is to be transformed and a predecessor object. The system adds an edge to the predecessor graph for each such predecessor relationship. FIG. 19 illustrates an exemplary predecessor graph. It should be noted that the predecessor relationship 1900 has been created for the purpose of determining a transformation order. This relationship may exist solely in the predecessor graph. That is, the data structures representing objects in Group 1 and Group 2 (FIG. 16) may not necessarily store information about the predecessor relationship 1900.

Sorting Objects into Transformation Order

As noted at 1504 (FIG. 15), after the predecessor relationships have been added to the predecessor graph, the objects in the graph are sorted into a transformation order, such that each predecessor object appears no later than all the objects that depend on it. The transformation order may be represented by a linked list (such as forward and backward pointers) extending through the nodes of the predecessor graph, or by a separate ordered list, or by any other suitable indicator. The transformation order is used during the first pass over the partitions to disconnect external relationships, and it is used during the second pass to geometrically transform the objects.

The predecessor graph may be sorted by any suitable method. Two exemplary methods will now be described. In a breadth-first sorting method, multiple passes (not to be confused with the two-pass methodology described for transforming objects described herein) may be made through the list of objects that are to be transformed. During each pass, the objects, all of whose predecessor objects have already been added, may be added to the list. This sorting method tends to put unrelated objects near each other in the transformation order list.

It may be desirable to use a depth-first sorting method that puts related objects near each other in the transformation order list. A single pass may be made over the predecessor graph to identify all objects that have no successor objects, i.e., to identify objects that are not predecessors to any other objects. For each object that has no successors, a recursive function may be called to add the object to the list. The function calls itself for each predecessor of the object, and then the function adds the object to the list. Thus, all the object's predecessors are added to the list before the object itself is added to the list.

Figure 20:
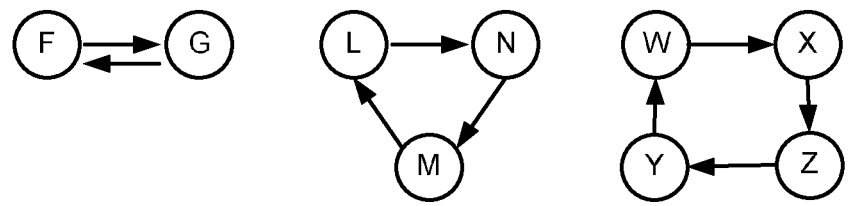
FIG. 20 schematically illustrates examples of loops in relationships between or among objects.

Two or more objects may be interrelated so as to form loops. Examples of such relationships are shown in FIG. 20. Loops may be detected during the sorting process. If a loop is detected, all the objects of a given loop are assigned to the same partition, so as to be transformed together.

Two objects, each of which considers the other object to be its predecessor, are referred to as "mutual predecessors." Mutual predecessor objects are assigned to the same partition. Similarly, loops of mutual predecessor objects are assigned to the same partition.

Once the objects in the predecessor graph are sorted, the objects may be assigned to successive partitions, starting with the object at the beginning of the sorted predecessor graph and continuing in sort order to the end of the graph.

The number of objects in each partition may depend on whether a loop or mutual predecessor objects are found. Otherwise, the number of objects in a partition may be chosen based on one or more criteria. For example, smaller partitions tend to increase robustness, in that if a partition transformation operation fails, the identity of the object causing the failure may be easier to ascertain than if a larger transformation operation fails. However, smaller partition transformation operations imply a larger number of such operations, which may negatively impact database performance. Partitions may include as few as one design object. All the partitions need not contain equal numbers of objects. I found that a partition size of one design object provides a good balance between robustness and performance. However, other group sizes may be used.

Objects may be assigned to partitions starting at the head of the sorted list of objects and continuing until all objects have been assigned to a respective partition.

Two Passes Over the Partitions

Figure 21:
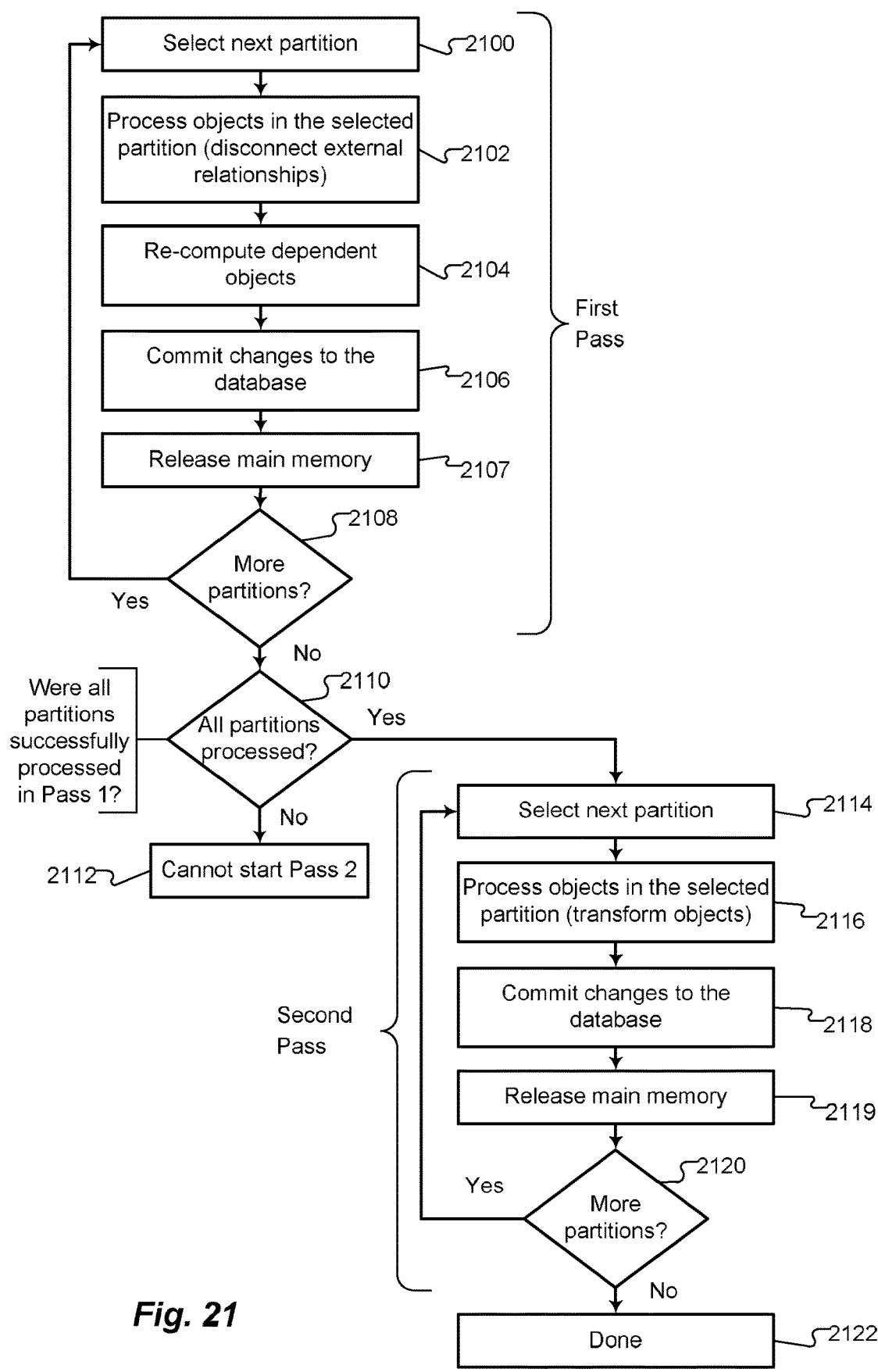
FIG. 21 is a flowchart summarizing operations ordering partitions and processing the partitions in sequence, according to an embodiment of the present invention.

As noted at 1404 (FIG. 14), after the objects have been sorted into a transformation order and divided into ordered partitions, the ordered partitions are processed in sequence, in the first pass to disconnect external relationships and in the second pass to geometrically transform objects, as summarized in a flowchart in FIG. 21 and described in more detail herein. During the first pass, the partitions are processed in a first loop. One partition is processed per traversal of the loop. At 2100, the next sequential partition is selected, and the selected partition is processed at 2102 to sever external relationships of objects in the partition. The processing at 2102 is expanded on in FIG. 22 and explained in more detail below. At 2104, objects that depend on the processed objects are recomputed. After all the objects in the selected partition have been processed, changes are committed to the database at 2106, and at 2107, main memory into which the representation of each object was loaded is released. Each traversal of the loop is an atomic operation. That is, either all the operations 2100-2104 are completed or nothing is committed to the database at 2106.

If more partitions remain to be processed, at 2108 control returns to 2100, where the next partition is selected. After all the partitions have been processed, control passes to 2110. At 2110, if at least one partition was not successfully processed, control passes to 2112. For example, if one or more objects that should have been processed during the first pass were read-only, the processing could not be completed, and the second pass cannot be begun. On the other hand, if the two-pass process is interrupted, such as due to a power failure, after the second pass has begun, none of the first pass should be performed again upon restart.

If, at 2110, all partitions were successfully processed during the first pass, control passes to 2114 for the second pass. During the second pass, the partitions are processes in a second loop. One partition is processed per traversal of the loop. At 2114, the next sequential partition is selected, and the selected partition is processed at 2116 to geometrically transform the objects in the partition. The processing at 2114 is expanded on in FIG. 22 and explained in more detail below. No processed object depends on any external object, and no external object depends on any processed object. This is a result of the disconnections performed in the first pass. Internal dependencies may exist among the objects in the partition. However, these dependencies are not affected by the geometric transformation. Therefore, no re-computation of dependencies is required for each partition in this pass. After all the objects in the selected partition have been processed, changes are committed to the database at 2118, and at 2119, main memory into which the representation of each object was loaded is released. Each traversal of the loop is an atomic operation. That is, either all the operations 2114-2116 are completed or nothing is committed to the database at 2118. If more partitions remain to be processed, at 2120 control returns to 2114, where the next partition is selected. After all the partitions have been processed, control passes to 2122.

Figure 22:
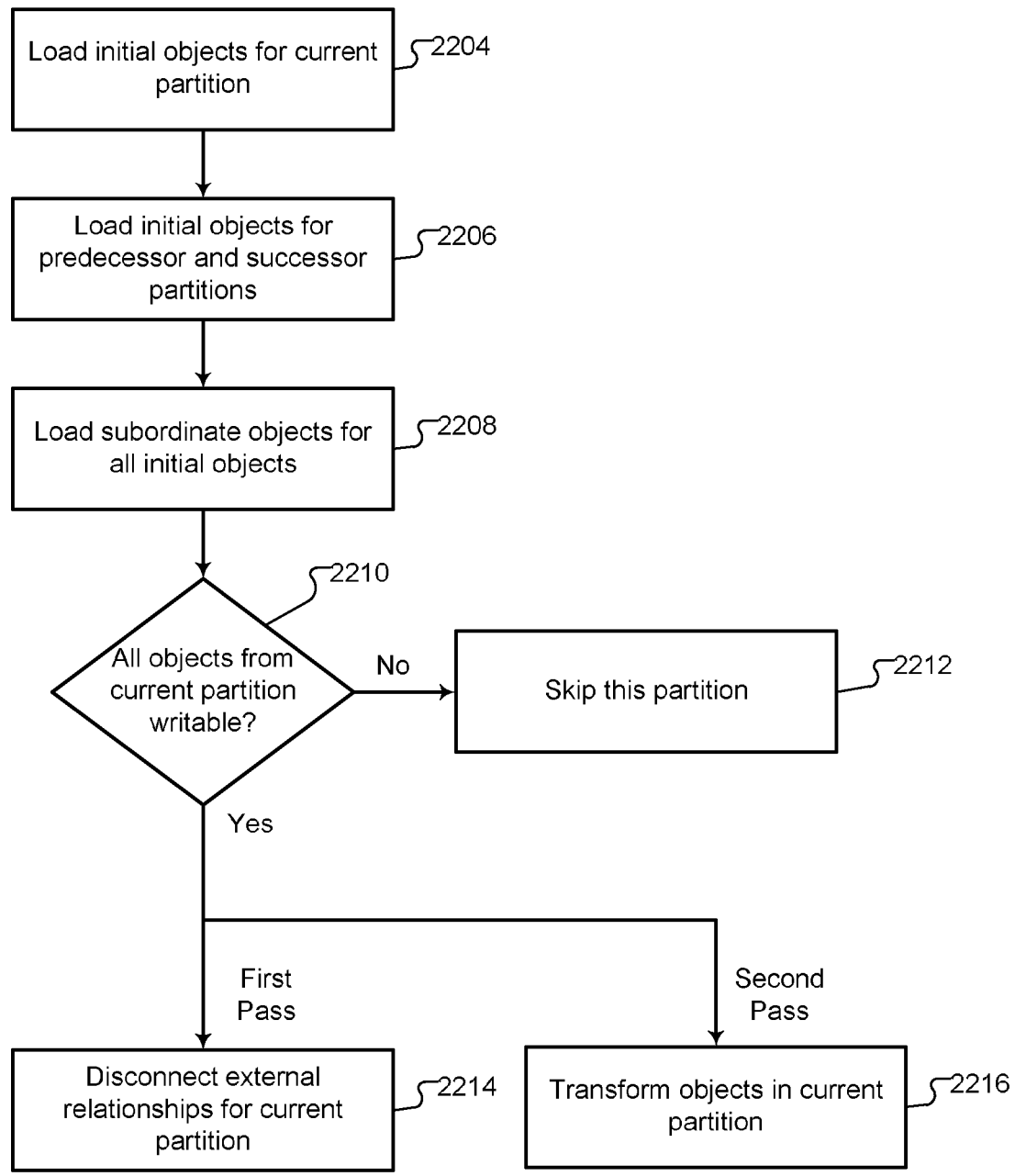
FIG. 22 is a flowchart illustrating processing objects in a selected partition, expanding on such an operation of FIG. 21, according to an embodiment of the present invention.

FIG. 22 is a flowchart that describes processing of objects in a single partition (the "current partition"), i.e., the flowchart expands on operations 2102 and 2116 (FIG. 21). The processing shown in FIG. 22 is performed in both passes, except as noted. At 2204, design objects specified by the user to be transformed ("initial objects") are loaded into memory ("bound") from the database 316 (FIG. 3). At 2206, initial objects from any predecessor partitions and any successor partitions are also bound into memory.

During the first pass, objects in predecessor and successor partitions are bound into memory to facilitate identification of external relationships. Any relationship from an object in the current partition to an object in a predecessor or successor partition is not external. However, a relationship from an object in the current partition to an object that is neither in a predecessor nor a successor partition is an external relationship.

As noted, some objects have subordinate objects. If an object that has a subordinate object is selected for transformation, the partition is enlarged to include the subordinate object(s). At 2208, any objects that are subordinate to any of the objects bound at 2204 or 2206 are identified, bound into memory and added to the current partition. More details on enlarging the partition (a process referred to as "propagation") are provided below.

At 2210, if all the objects in the current partition are not writable, the current partition is skipped at 2212.

As noted, an external relationship may exist between two objects, one of which is selected for transformation and the other of which is not selected for the transformation. For example, if a dependent object is selected for geometric transformation, but the object from which the dependent object depends (i.e., its predecessor object) is not also selected for the transformation, the selected object is involved in an external relationship. Similarly, if an independent object is selected for geometric transformation, but one or more of its dependent objects are not also selected for the transformation, the selected object is involved in an external relationship. Several optional or alternative approaches may be used to handle external relationships.

In the preferred embodiment, the external relationship is broken, i.e., the objects are disconnected from each other during the first pass at 2214. Treatment of the dependent object may depend on domain specific requirements. For example, in some cases, if the dependent object can exist without a relationship to its predecessor object, the dependent object becomes independent. On the other hand, if the dependent object cannot exist without a relationship to its predecessor, the dependent object is deleted. In other cases, the dependent object is handled differently, as required by the domain specific requirements.

In another embodiment, the user may be prompted and given an opportunity to add the predecessor object to the list of objects that are to be transformed. In another embodiment, the predecessor object may be automatically added to the list of objects that are to be transformed, with or without notifying the user. The enterprise engineering system may include a user-selectable or administrator-selectable parameter, by which one of these actions may be selected.

At 2216, during the second pass, the objects in the current partition are transformed. The objects in any given partition may be transformed in any order. Data structures representing the objects whose external relationships have been disconnected or transformed objects, depending on the pass, are committed to the database, as noted at 2106 and 2118 (FIG. 21). If all operations succeed, the status of the partition's object is set to "Transformed."

Transform Graph

Figure 23:
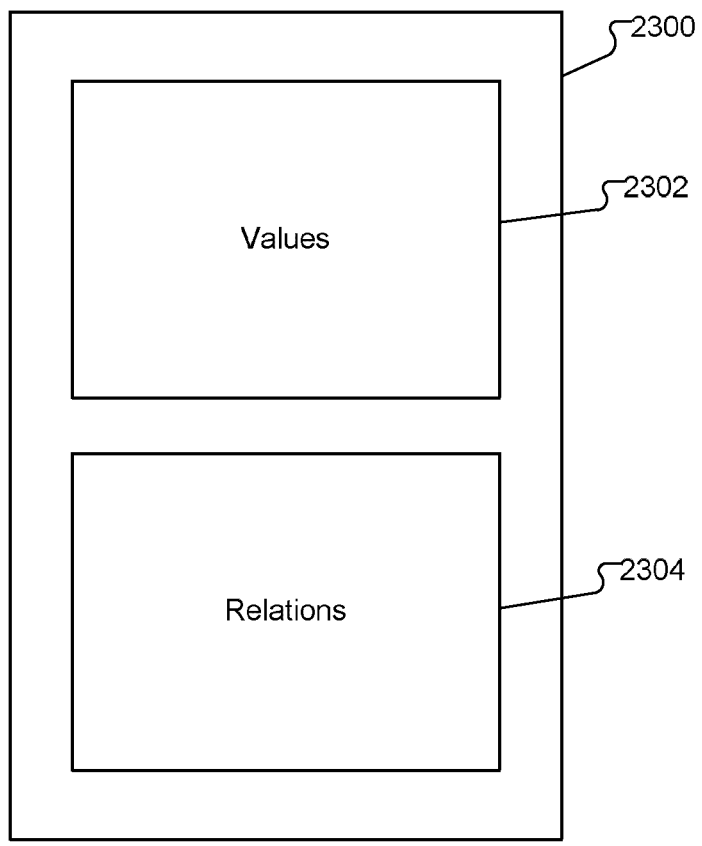
FIG. 23 is a schematic diagram of a transform graph data structure, according to an embodiment of the present invention.

A transform graph data structure is built and used during the processing of each partition in both passes. The data structure may be deallocated after the partition has been processed. The transform graph data structure stores references to objects and relationships among the objects while external relationships are disconnected and while the partition is transformed. FIG. 23 is a schematic diagram of one embodiment of a transform graph data structure 2300. The transform graph data structure 2300 includes two portions: a values portion 2302 and a relations portion 2304. The same kind of transform graph data structure 2300 is constructed and used during both passes. Therefore, the following description applies to both passes, *mutatis mutandis*.

Figure 24:
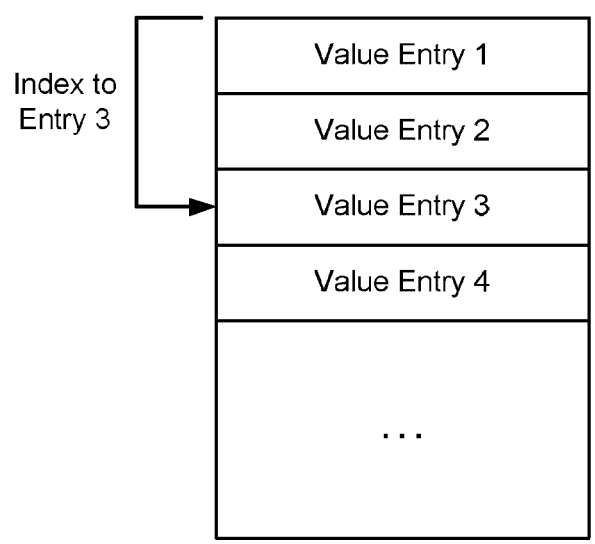
FIG. 24 is a schematic diagram of a value entry array of the transform graph data structure of FIG. 23, according to an embodiment of the present invention.

The values portion 2302 includes an array of individual value entries, as shown in FIG. 24. Each value entry represents an object. Each value entry may be uniquely identified by an index into the value array. Each value entry includes several fields, including Source Partition, Flags and Object Pointer, as shown in FIG. 25. The Source Partition identifies a partition to which the corresponding object is associated. Possible values for Source Partition are: Predecessor, Current, Successor and None. The Flags contain additional information about the partition, such as whether this value is an Initial object or a Subordinate object. The Object Pointer points to the object, once the object has been loaded into memory.

As noted, a transform graph data structure 2300 is built for each partition. The OIDs of all the objects of the current partition are entered into respective entries in the transform graph data structure 2300. These OIDs are used to load the corresponding objects (bind the objects) into memory. For each such object, the Source Partition is set to be Current to indicate the object is to be transformed. In addition, for each such object, an Initial flag is set for each initial object.

The relations portion 2304 (FIG. 23) of the transform graph also includes an array of entries, and each entry can be uniquely identified by an index. Each relationship entry represents a relationship between two objects and includes a Relationship Pointer and two indices (Origin Index and Destination Index) to the two objects that have the relationship represented by the relationship entry, as shown in FIG. 26. The Origin Index contains an index into the values array 2302 to a value entry for an object at the "origin" end of the relationship. The Destination Index contains an index into the values array 2302 to a value entry for an object at the "destination" end of the relationship. The Relationship Pointer contains a pointer to a relationship that has been loaded into memory.

Partitions containing predecessor objects and successor objects of the objects represented by OIDs in the transform graph data structure 2300 are also bound into memory, and OIDs for these objects are added to the transform graph data structure 2300. For each such object, the Initial flag is set and the Source Partition is set to be either Predecessor or Successor (as the case may be). The predecessor objects will have already been transformed in some previous transaction, i.e., in an earlier partition, and the successor objects will be transformed in some subsequent transaction, i.e., in a later partition.

The objects initially represented in the transform graph data structure 2300 are design objects selected by the user. However, some or all of these design objects may include subordinate objects. Objects that are subordinate to the objects to be transformed in the current partition should also be transformed in the same partition. These objects are bound into memory, and information about these subordinate objects is added to the transform graph data structure 2300 to facilitate: (a) checking whether the subordinate objects are write accessible, (b) identifying external relationships with other objects and disconnecting these external relationships, where necessary and (c) transforming the subordinate objects.

A process called "propagation" adds the subordinate objects to the transform graph data structure 2300. All the relationships of the objects in the transform graph data structure 2300 are explored to identify subordinate objects to be added. Each type of relationship includes metadata that defines how the transform graph data structure 2300 should be expanded. Each task 302-306 (FIG. 3) that creates a design object is responsible for relationships that its objects may be involved in and for setting the metadata for these relationships. The core platform 301 (FIG. 3) uses this metadata; thus, the core platform 301 need not be configured with foreknowledge of these relationships or specific information about design objects.

Each relationship entry in the relations portion 2304 of the transform graph 2300 has a type, much like an object has a class. Each relationship type (also referred to as a relationship definition) has a set of properties. These properties are summarized in Table 5.

TABLE 5

| | |
|---|---|
| Expands Transform Forward | If the current object is at the origin of the relationship, this property controls whether the object at the destination end of the relationship is added to the transform graph |
| Expands Transform Backward | If the current object is at the destination of the relationship, this property controls whether the object at the origin end of the relationship is added to the transform graph |

Table 6 summarizes possible values for the properties listed in Table 5.

TABLE 6

| | |
|---|---|
| No Expand | The target object is not involved in the transform operation |
| Expand to Internal Object | The target object is a subordinate object of the current design object |
| Expand to External Object | The target object is part of a different design object |
| Expand to Connection Object | The target object is a connection object that exists only when two design objects are connected to each other |

If the Source Partition is set to Current, Table 7 governs propagation.

TABLE 7

| Expands Transform Property | Add Target Object to the Graph? | Set Source Partition to be Current? |
|---|---|---|
| No Expand | No | No |
| Expand to Internal Object | Yes | Yes |

TABLE 7-continued

| Expands Transform Property | Add Target Object to the Graph? | Set Source Partition to be Current? |
|---|---|---|
| Expand to External Object | Yes | No |
| Expand to Connection Object | Yes | No * |

Connection objects do not belong to any design object. Instead, connection objects exist between design objects for the purpose of connecting them. Connection objects are created for the purpose of connecting two design objects. They are deleted when the two design objects are disconnected. Connection objects are neither internal nor external. The asterisk in Table 7 refers to this special handling of connection objects.

If the Source Partition is either Predecessor or Successor, Table 8 governs propagation.

TABLE 8

| Expands Transform Property | Add Target Object to the Graph? | Set Source Partition to be Same as the current object? |
|---|---|---|
| No Expand | No | No |
| Expand to Internal Object | Yes | Yes |
| Expand to External Object | No | No |
| Expand to Connection Object | Yes | Yes |

When a target object is added to the transform graph data structure 2300, the relationship from the current object to the target object is also added to the transform graph data structure 2300.

Although there may be multiple relationship pathways through the transform graph data structure 2300 to a given object, an object is not added to the transform graph data structure 2300 more than once. It is, however, possible for a second or subsequent pathway to an object to result in the Source Partition being updated. For example, when an object is first added to the transform graph data structure 2300, the object's Source Partition may not be set. However, during a later phase of propagation, the same object may be found to be a predecessor or successor object. In such a situation, the Predecessor and/or Successor Partition is set, as the case may be.

As noted, subordinate objects of the objects in the current partition are bound into memory and access control of the subordinate objects is checked. If any subordinate object is found to be read-only, the partition is marked as containing a read-only object, processing of the partition is ended and a transaction status of Failed Due to Read-Only Object is set for the partition.

A Transformation Propagation Property value of Expand to External Object or Expand to Connection Object indicates that the relationship crosses between design objects and is a candidate for disconnection. If only one of the two design objects of the relationship is selected for transformation, the relationship should be disconnected. As noted, in other embodiments, other types of processing may be provided.

As noted, the Index fields contain indices to the origin object's entry and the destination object's entry in the transform graph data structure 2300. To decide if a relationship should be disconnected, the Source Partition values at both ends of the relationship are examined. If the Current Partition is set at one end of a relationship, the corresponding object is to be transformed during the current partition's transformation. If neither theCurrent, Predecessor nor Successor Partition is set at the other end of the relationship, the far-end object has not been transformed and it will not be transformed during the current operation. Such a relationship should be disconnected. These rules are summarized in Table 9.

TABLE 9

| If one object is in the Current Partition and the related object is: | Then: |
|---|---|
| Current | Do not disconnect the relationship |
| Predecessor | This object has already been transformed in a previous transaction and should not be disconnected |
| Successor | This object will be transformed in a subsequent transaction and should not be disconnected |
| Not Current, Not Predecessor and Not Successor | This object will not be transformed during the current operation, and this relationship should be disconnected |

As noted, object classes are defined by a task 302-306 (FIG. 3). Thus, the task 302-306 defines methods for transforming objects. For each object in the transform graph data structure 2300 that is flagged Current, the object's transform method is called during the second pass.

During the first pass, after relationships to the objects are disconnected, functional dependencies are computed. Dependency functions are called for all objects that have had relationships disconnected. Some of these functions update other (dependent) objects within the current partition. This can be done, because objects in the current partition are writeable. Other dependency functions would otherwise update objects in successor partitions. Consequently, these objects in the successor partitions become "out of date," relative to the current partition. All changes are then committed to the database 316 (FIG. 3).

As noted, an operation object is created to facilitate restarting the operation. For example, an indication of which pass (first or second) is currently being processed is stored in the operation object. In addition, after the source list of objects has been partitioned, a partition object is created to represent each partition. Relationships are established between the operation object and the partition objects. In addition, relationships are established between each partition object and its predecessor and successor partition's object, respectively. While processing each partition, the corresponding partition object is bound into memory and values of its Transaction Result property are updated, as summarized in Table 10.

TABLE 10

| Transaction Result Value | Description |
|---|---|
| Not Attempted | This partition was not processed in Pass 1. This is the default value for each partition before processing begins. |
| Disconnected | This partition was successfully processed in Pass 1. (It was successfully disconnected from external objects.) |
| Read-Only 1 | Pass 1 processing of this partition detected a read-only object. |
| Succeeded | This partition was successfully processed in Pass 2. (It was successfully transformed.) |
| Read-Only 2 | Pass 2 processing of this partition detected a read-only object. |
| Failed | A failure occurred while attempting to commit changes to the database |

As noted, certain conditions should be met before the second pass begins. All the partitions should have been successfully processed in the first pass. Each partition should have a Transaction Result value of either Disconnected or Failed. If any partition has a Transaction Result value of Read-Only 1, a read-only object was encountered during the first pass, and user intervention may be required to correct the problem and restart the operation.

If a large geometric transformation fails to complete successfully, the operation and partition objects record the current state of the operation. Typically, before restarting an operation, a user may take some corrective action, such as restarting a failed server or modifying read-only objects to make them writeable. A restart may be initiated the same way as a new geometric transformation may be initiated. The software that starts a new geometric transformation begins by querying the database to ascertain the status of the previous transformation operation, i.e. by querying the operation and partitions objects. Each transformation operation may be named by the invoking user via the Name field 704 (FIG. 7). The user interface for initiating a geometric transformation may display a list of previously started operations, and the user may select a failed operation to restart the operation.

When an operation is restarted, the operation object and all the partition objects of the restarted operation are bound into memory, and processing resumes with the first unprocessed partition in the current pass. Other partitions are processed, as described above. A Failed partition indicates a problem with the data, not a problem that a user could control. Problems, such as read-only data, that can be controlled by user are not marked Fail. Because Failed operations cannot be rectified by users, there is little point is allowing a Failed partition to be processed again.

Operation and partition objects may be kept in the database even after the corresponding operation completes successfully to provide a historical record as long as needed, and then the objects may be deleted.

Example

The following hypothetical example illustrates operation of the apparatus and methods described above. The example contains an arbitrarily small number of objects, for simplicity of explanation. However, the principles involved may be applied to larger numbers of objects.

Figure 27:
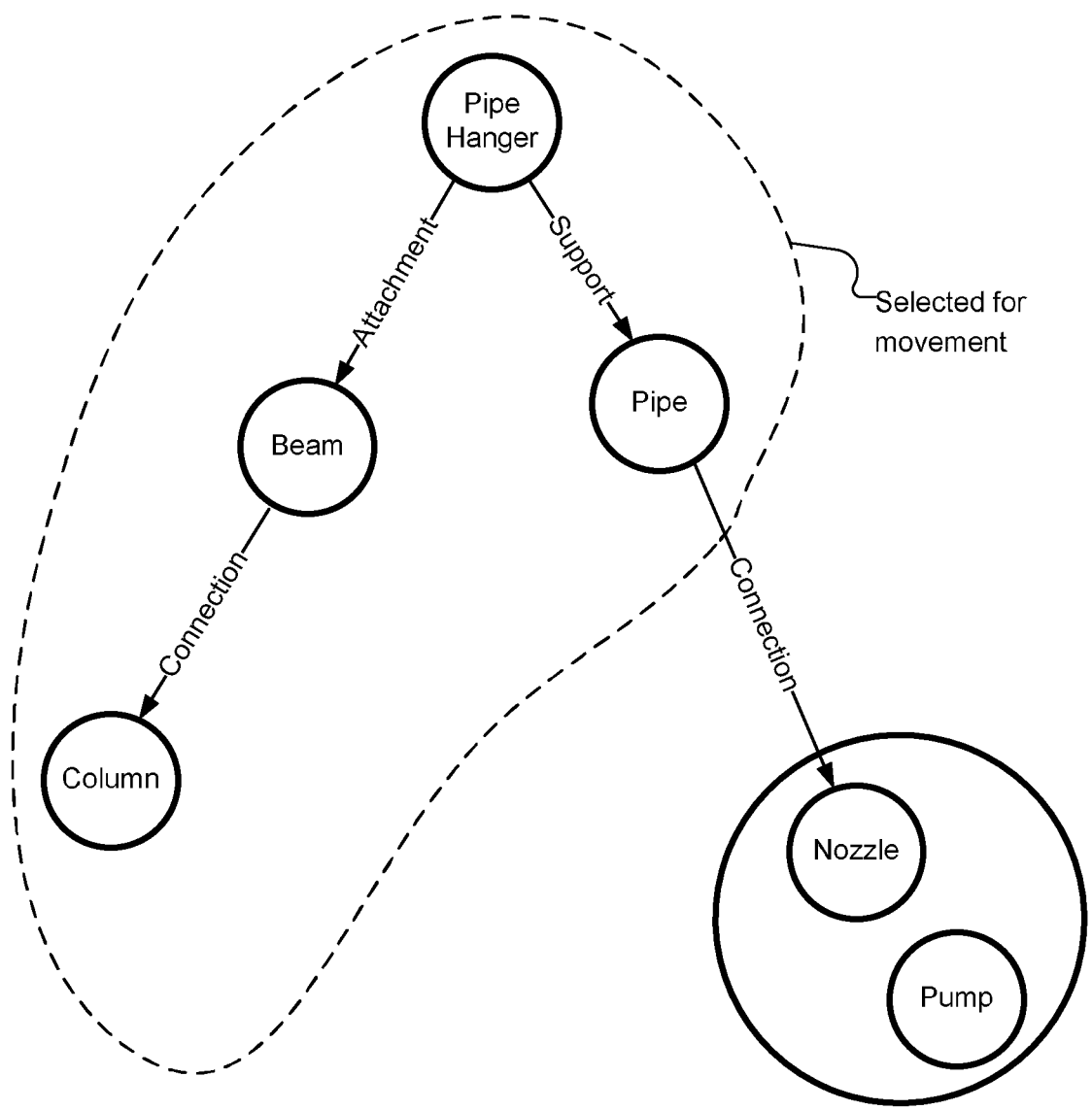
FIG. 27 is a schematic diagram illustrating several hypothetical objects and relationships therebetween, according to an embodiment of the present invention.

The example involves five interrelated design objects: a Pump, a Pipe, a Column, a Beam and a Pipe Hanger, schematically illustrated in FIG. 27. The Pipe is connected to a Nozzle on the Pump. The Pipe is supported by the Pipe Hanger. The Pipe Hanger is attached to the Beam. The Beam is connected to the Column. Assume a user specified all these objects, except the Pump, are to be moved 100 meters east. Also assume the user has write access to all the objects.

The transformation process includes identifying all predecessors of each design object. The Pump is a predecessor of the Pipe. However, the Pump will not appear in the predecessor graph, because the Pump will not be moved. The Column is a predecessor of the connected Beam. Both the Beam and the Pipe are predecessors of the Pipe Hanger.

Figure 28:
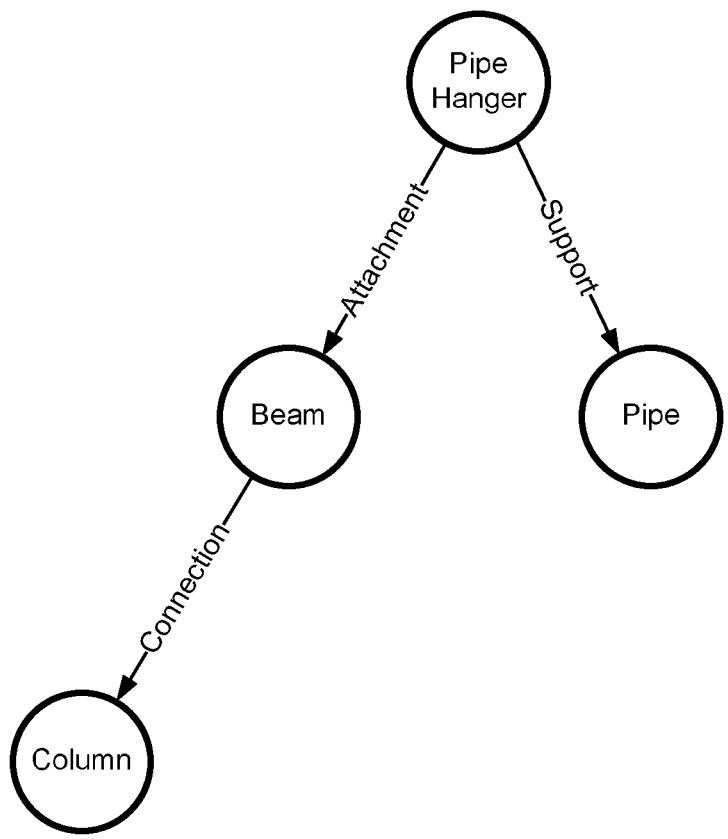
FIG. 28 is a schematic representation of a predecessor graph, corresponding to the objects and relationships of FIG. 27.

A predecessor graph is constructed from the list of predecessors for each design object (Pipe Hanger, etc.). FIG. 28 is a schematic representation of a predecessor graph that corresponds to the objects in FIG. 27. Arrows point to predecessors for each design object.

Figure 29:
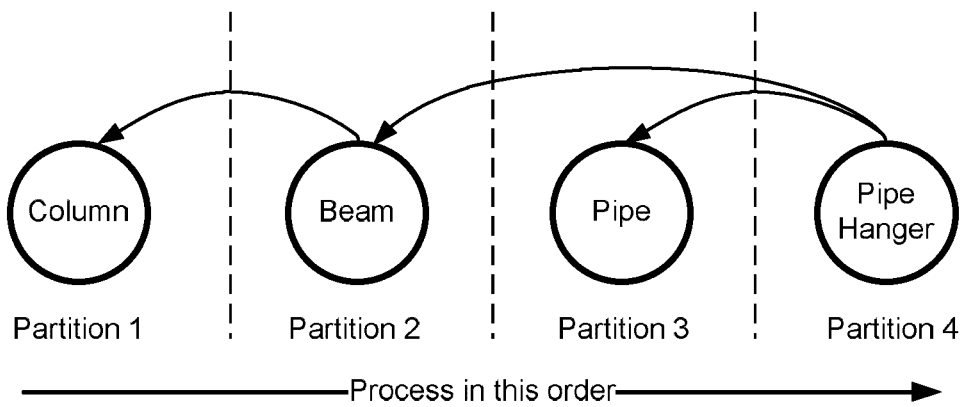
FIG. 29 is a schematic diagram illustrating the objects of FIGS. 27 and 28, after the objects have been divided into partitions, according to an embodiment of the present invention.

The nodes of the predecessor graph are sorted into a linear sequence, such that predecessors appear before successors, as illustrated in FIG. 29. The partitions are then processed in the specified sequence, in two passes. During each pass, when processing of each partition is complete, modified objects are committed to the database. During the first pass, relationships to external objects, i.e., the Pump, are disconnected. During the second pass, each remaining object is geometrically transformed, i.e., moved 100 meters east. Each partition is transformed in a separate atomic transaction. Each transaction will now be described in detail.

Transaction 1 involves moving the objects of Partition 1, which involves the following operations, summarized and indicated schematically in FIG. 30. During the first pass in Transaction 1, external relationships are severed, and during the second pass objects are moved. In FIGS. 30-33, operations that are performed during only one of the two passes are identified by the pass during which they are performed. The other operations shown in FIGS. 30-33 are performed during each of the two passes. Thus, Partition 1 is the current partition during Transaction 1. The initial object (Column) from the current partition and the initial object (Beam) from the successor partition are loaded into memory and added to the transform graph. The transform graph is expanded by propagation. Propagation of the initial objects (Column and Beam) binds subordinate objects (End Port 1, End Port 2 and Physical Part for Column; and End Port 1, End Port 2 and Physical Part for Beam) into memory and into the transform graph. No external relationship is identified; therefore, no relationship is disconnected during the first pass. Functional dependencies are computed during the first pass for any objects whose relationships are disconnected (none in this example). The Column and its subordinate objects (End Port 1, End Port 2 and Physical Part) are transformed (moved 100 meters east) during the second pass. The modified (transformed) Column object and its subordinate objects are committed to the database.

Figure 31:
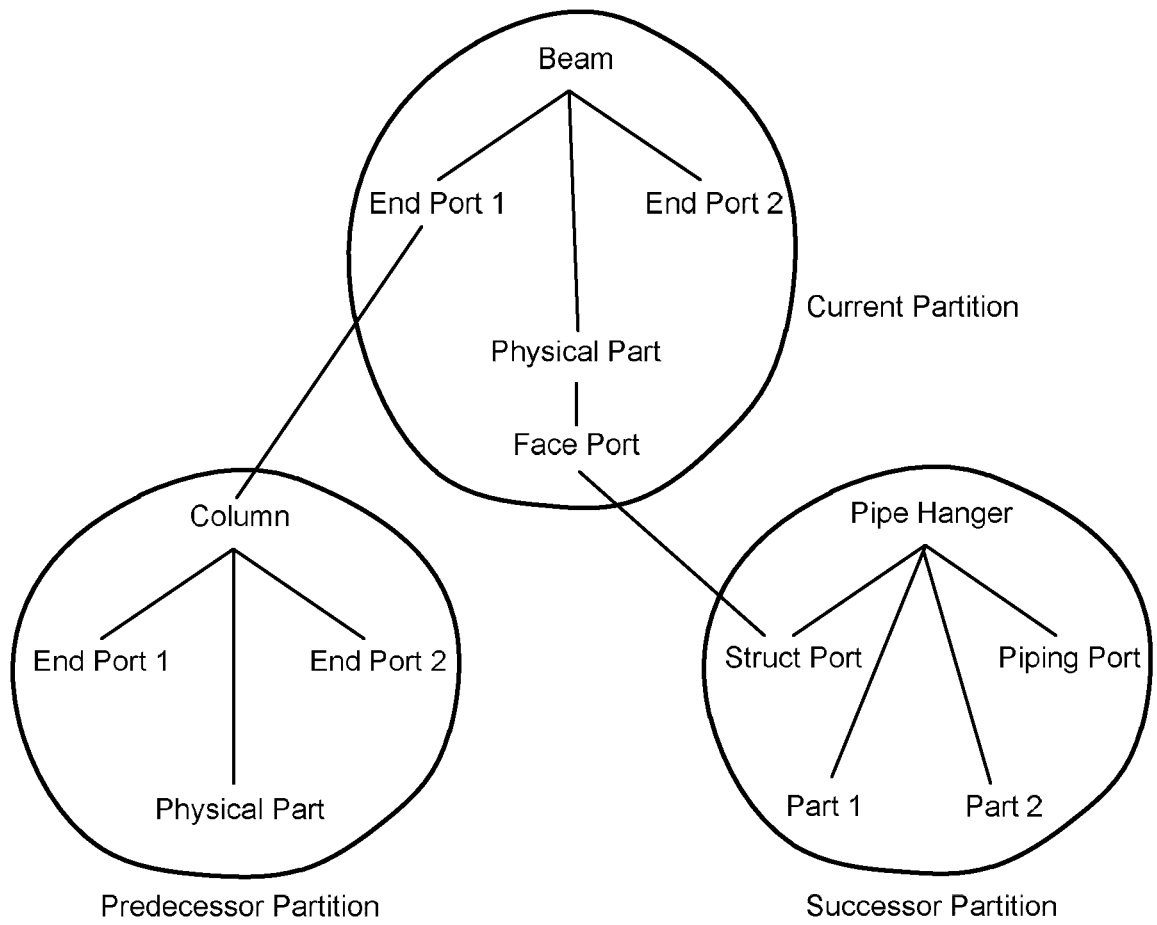

Transaction 2 involves moving the objects of Partition 2, as summarized and indicated schematically in FIG. 31. During the first pass in Transaction 2, external relationships are severed, and during the second pass objects are moved. Partition 2 is the current partition during Transaction 2. The initial object (Beam) from the current partition and the initial object (Column) from the predecessor partition (Partition 1) and the initial object (Pipe Hanger) from the successor partition (Partition 4) are loaded into memory and added to the transform graph. Note that the successor partition is Partition 4, because the Pipe Hanger object depends on an object (Beam) in the current partition. The transform graph is expanded by propagation. Propagation of the initial objects (Beam, Column and Pipe Hanger) binds subordinate objects (End Port 1, End Port 2 and Physical Part for Column; End Port 1, End Port 2, Physical Part and Face Port for Beam; and Struct Port, Part 1, Part 2 and Piping Port for Pipe Hanger) into memory and into the transform graph. No external relationship is identified; therefore, no relationship is disconnected during the first pass. Functional dependencies are computed during the first pass for any objects whose relationships are disconnected (none in this example). The Beam and its subordinate objects (End Port 1, End Port 2, Physical Part and Face Port) are transformed (moved 100 meters east) during the second pass. The modified (transformed) Beam object and its subordinate objects are committed to the database.

Transaction 3 involves moving the objects of Partition 3, as summarized and indicated schematically in FIG. 32. During the first pass in Transaction 3, external relationships are severed, and during the second pass objects are moved. Partition 3 is the current partition during Transaction 3. The initial object (Pipe) from the current partition and the initial object (Pipe Hanger) from the successor partition (Partition 4) are loaded into memory and added to the transform graph. The current partition has no predecessor partition. The transform graph is expanded by propagation. Propagation of the initial objects (Pipe and Pipe Hanger) binds subordinate objects (End Feature, Flange, Connection, Straight Feature, Straight Pipe and End Feature for Pipe; and Piping Port, Part 1, Part 2 and Struct Port for Pipe Hanger) into memory and into the transform graph. The relationship 3240 between the Pump Nozzle of the Pump and the Connection object of the Pipe is identified as an external relationship and is, therefore, disconnected during the first pass. Functional dependencies are computed. Because the Pump can exist as an independent object, parameters of the Pump Nozzle and/or the Pump are recomputed and stored in the database during pass 1. The Pipe and its subordinate objects (End Feature, Flange, Connection, Straight Feature, Straight Pipe and End Feature) are transformed (moved 100 meters east) during the second pass. The modified (transformed) Pipe object and its subordinate objects are committed to the database.

Figure 33:
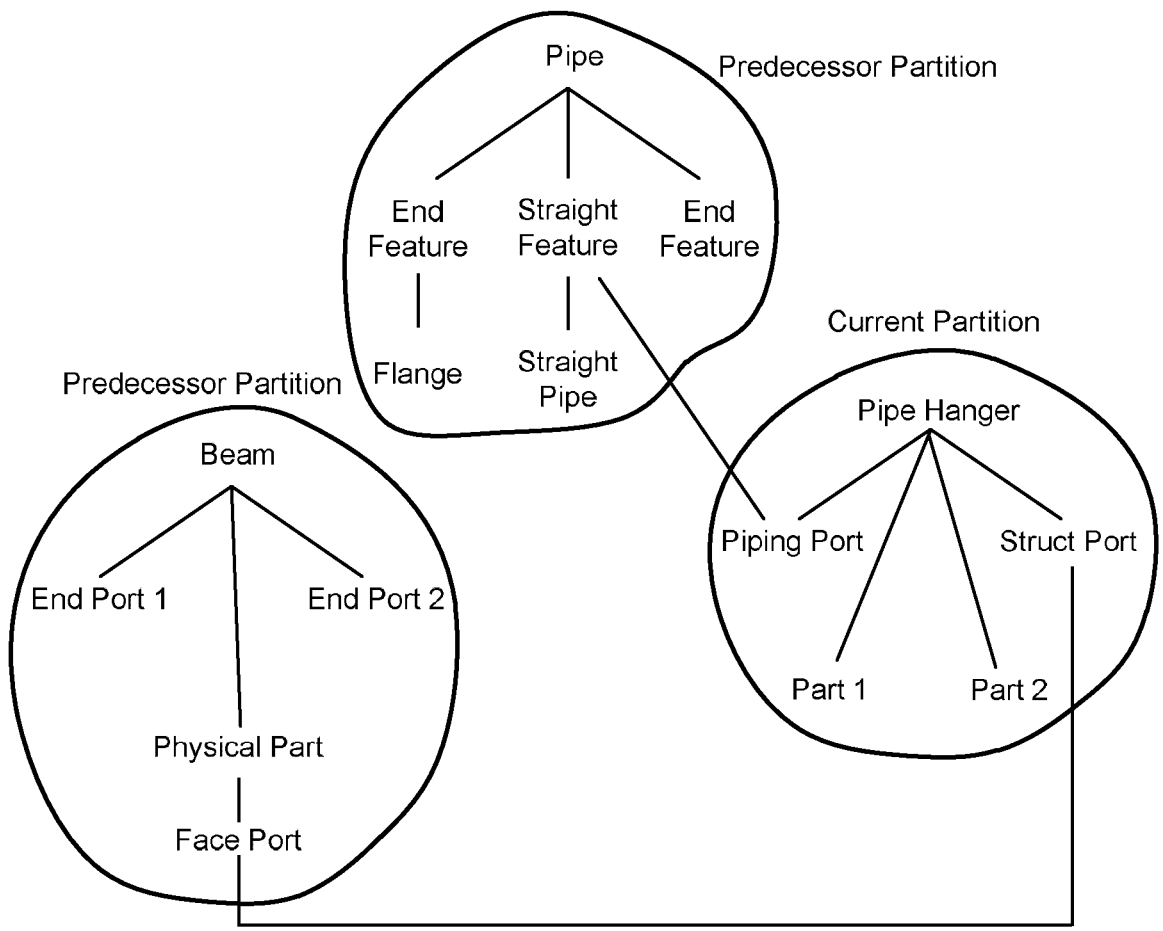

Transaction 4 involves moving the objects of Partition 4, as summarized and indicated schematically in FIG. 33. During the first pass in Transaction 4, external relationships are severed, and during the second pass objects are moved. Partition 4 is the current partition during Transaction 4. The initial object (Pipe Hanger) from the current partition and the initial objects (Beam and Pipe) from the predecessor partitions (Partition 2 and Partition 3) are loaded into memory and added to the transform graph. The current partition has no successor partition. The transform graph is expanded by propagation. Propagation of the initial objects (Pipe Hanger, Beam and Pipe) binds subordinate objects (Piping Port, Struct Port, Part 1, and Part 2 for the Pipe Hanger; End Port 1, End Port 2, Physical Part and Face Port for Beam; and End Feature, Flange, Connection, Straight Feature, Straight Pipe and End Feature for Pipe) into memory and into the transform graph. No external relationship is identified; therefore, no relationship is disconnected during the first pass. Functional dependencies are computed during the first pass for any objects whose relationships are disconnected (none in this example). The Pipe Hanger and its subordinate objects (Struct Port, Part 1, Part 2 and Piping Port) are transformed (moved 100 meters east) during the second pass. There are no successor partitions. The modified (transformed) Pipe Hanger object and its subordinate objects are committed to the database.

As a result of the Transactions 1-4, the selected objects have been moved. The Pump object, which was not selected for transformation, has been disconnected from the Pipe.

Two-Pass Embodiment

Figure 36:
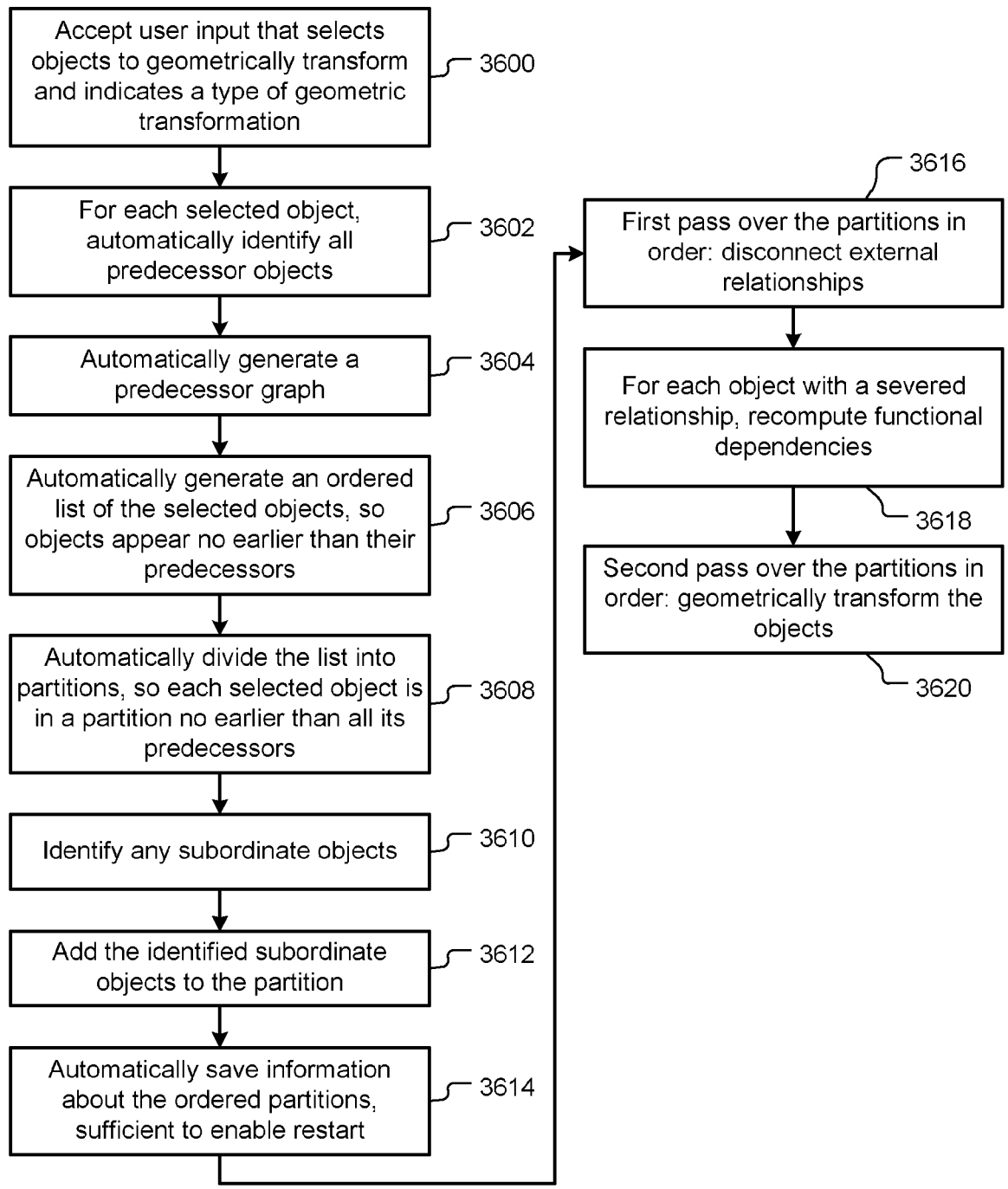
FIGS. 36-38 contain flowcharts that schematically illustrate a computerized method for geometrically transforming a plurality of objects represented within an object-oriented enterprise engineering system, according to an embodiment of the present invention.
Figure 37:
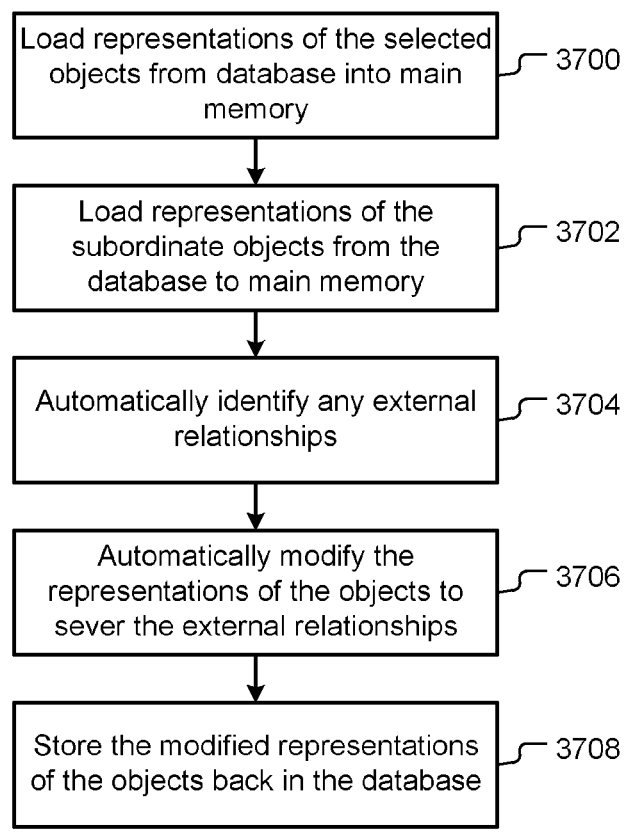
Figure 38:
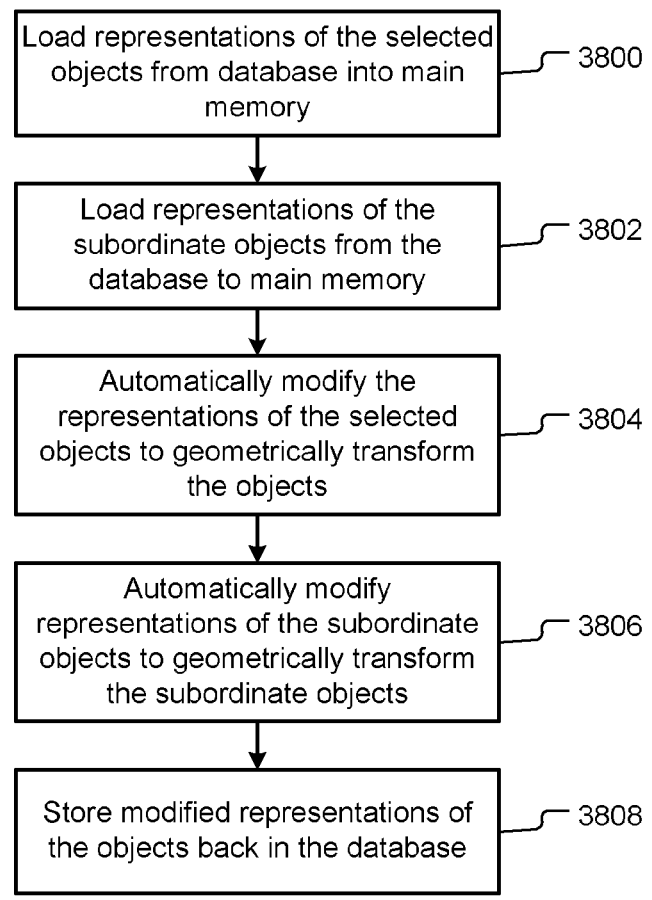

FIGS. 36-38 contain flowcharts that schematically illustrate operation of a two-pass embodiment of the present invention. At 3600, user input is accepted to select objects to be geometrically transformed and an indication of a type of geometric transformation to be performed. At 3602, for each selected object, all predecessors are automatically identified. At 3604, a predecessor graph is automatically generated. At 3606, an ordered list of the selected objects is automatically generated, such that objects appear in the list no earlier than their predecessors.

At 3608, the ordered list is automatically divided into partitions, such that the selected objects are members of partitions no earlier than their respective predecessors. At 3610, any subordinate objects are automatically identified, and at 3612, the subordinate objects are added to the partitions in which their respective design objects appear, as discussed herein with respect to "propagation."

At 3614, information about the ordered partitions, sufficient to enable restart of the geometric transformation after a system failure, is automatically stored in non-volatile memory.

At 3616, in a first pass over the partitions, external relationships are automatically disconnected. At 3618, for each object with a disconnected relationship, functional dependencies are automatically recomputed. At 3620, in a second pass over the partitions, the objects are geometrically transformed.

The processing of first pass 3616 is schematically illustrated in more detail in the flowchart of FIG. 37. At 3700, representations of the selected objects are loaded from the database into main memory. At 3702, representations of the subordinate objects are loaded from the database into the main memory. At 3704, the external relationships are automatically identified. At 3706, the representations of the objects are modified to sever the external relationships. At 3708, modified representations of the objects are stored back in the database.

The processing of second pass 3620 (FIG. 36) is schematically illustrated in more detail in the flowchart of FIG. 38. At 3800, representations of the selected objects are loaded from the database into main memory. At 3802, representations of the subordinate objects are loaded from the database into the main memory. At 3804, the representations of the selected objects are modified to geometrically transform the objects. At 3806, the representations of the subordinate objects are modified to geometrically transform the objects. At 3708, modified representations of the objects are stored back in the database.

Alternative Embodiment: Single Pass Over the Partitions

In an alternative embodiment of the present invention, only one pass is made over the partitions. As each partition is processed, external relationships with objects in the partition are disconnected. The relationships are severed, and the objects are transformed, in the same transaction. Whenever a relationship is severed, dependent objects should be recomputed. In this embodiment, the recomputations are performed at the end of each transaction. Objects in successor partitions are "frozen" to prevent them from being recomputed at the wrong time. As each partition is transformed, all objects in successor partitions (and their respective subordinate objects, if any) are placed into the frozen state. Instead of immediately recomputing the frozen object, the system generates a "to-do" record for each frozen object, which effectively defers transforming the frozen object until its respective partition is transformed. Information is stored in the transform graph data structure 2300 (FIG. 23) to facilitate freezing these objects and for other purposes.

Objects in successor partitions are bound into memory so they can be frozen to prevent re-computation while the current partition is being transformed. For example, as partition 202 (FIG. 2) is transformed, all objects in partition 206 (and their subordinate objects) are frozen. If the frozen object is dependent on another object, the frozen object is not immediately recomputed in response to its independent object being modified. Therefore, information about the object can be thought of as being out-of-date.

Typically, the out-of-date objects are transformed in a partition shortly after the current partition is completed. Thus, the to-do records are typically processed and deleted soon after they have been created. However, if a large geometric transformation is interrupted, such as by a user invoking a cancel control or by a hardware or software failure, the to-do records indicate which operations should be performed upon restarting the operation.

After the last partition has been transformed, if any to-do records remain, a failure indicator is set to indicate that at least one frozen object was not transformed. On the other hand, if no to-do records remain, a success indicator is set.

Some objects may be frozen to support disconnecting relationships to other objects. For example, objects that are not being transformed, but that are related to objects that are to be transformed, are referred to as external objects. In the example shown in FIG. 1, objects X1, Y1 and Z1 are external objects, and objects (such as objects A2, B1 and D3) that are related to the external objects are frozen to facilitate disconnecting the relationships.

As each partition of objects is processed, objects in predecessor and successor partitions are placed into a frozen state, and a to-do record is generated for each such frozen object, which effectively defers transforming the frozen object until its respective partition is transformed. When a frozen object is eventually transformed, its corresponding to-do record is deleted. Thus, after all the partitions have been transformed, no to-do records should remain. The to-do records are generated and deleted within operation 2102 (FIG. 21).

At 2206 (FIG. 22), initial objects from any predecessor partitions and any successor partitions are also bound into memory, and these objects are frozen. Objects in predecessor partitions have already been transformed, i.e., in an earlier transaction. These objects are frozen to prevent doubly transforming them, i.e., once as a result of having been selected for transformation by the user and a second time as a result of being a predecessor object to an object that was selected for transformation.

Figure 34A:
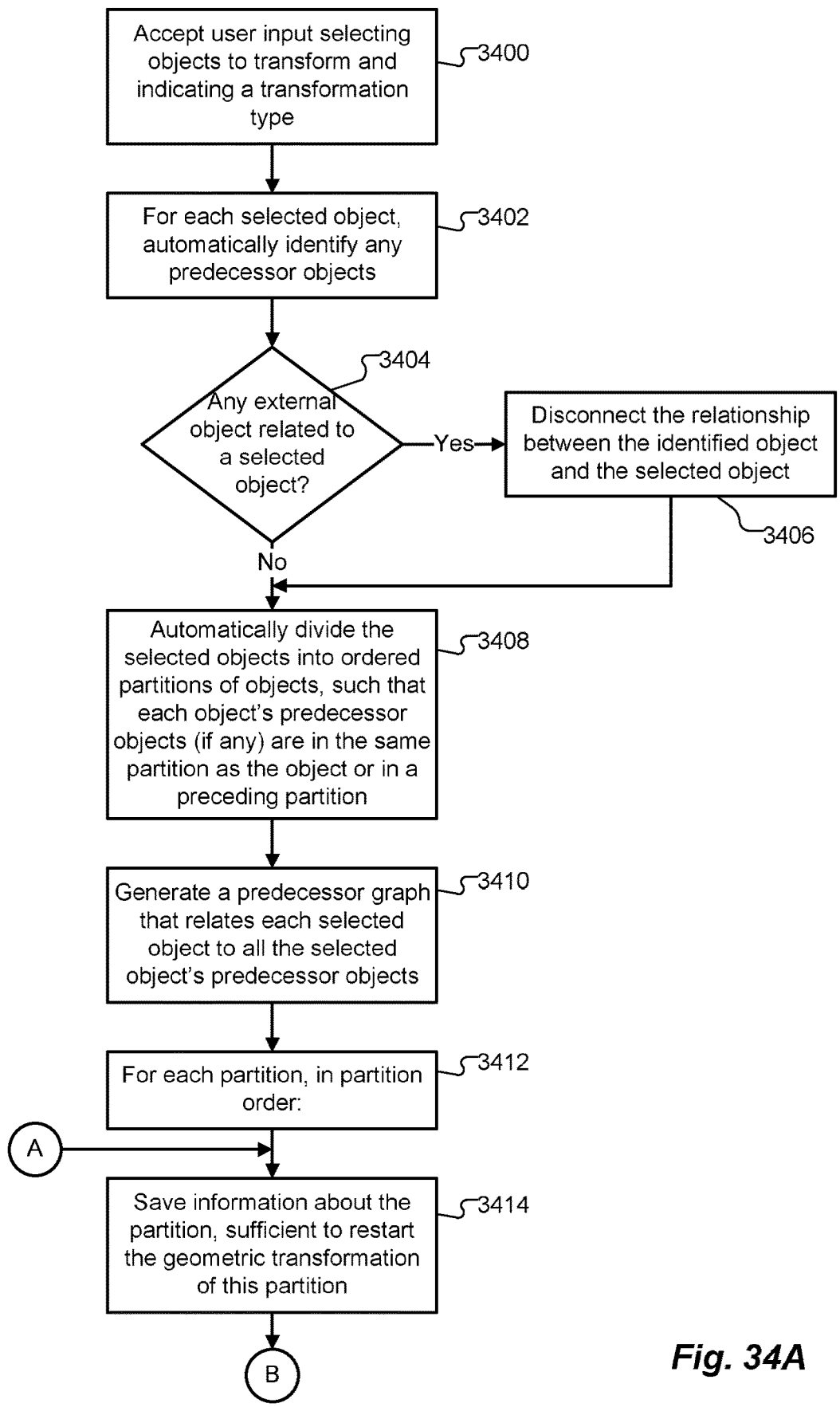
FIG. 34A-B contains a flowchart that schematically illustrates a computerized method for geometrically transforming a plurality of objects represented within an object-oriented enterprise engineering system, according to an alternative embodiment of the present invention.
Figure 34B:
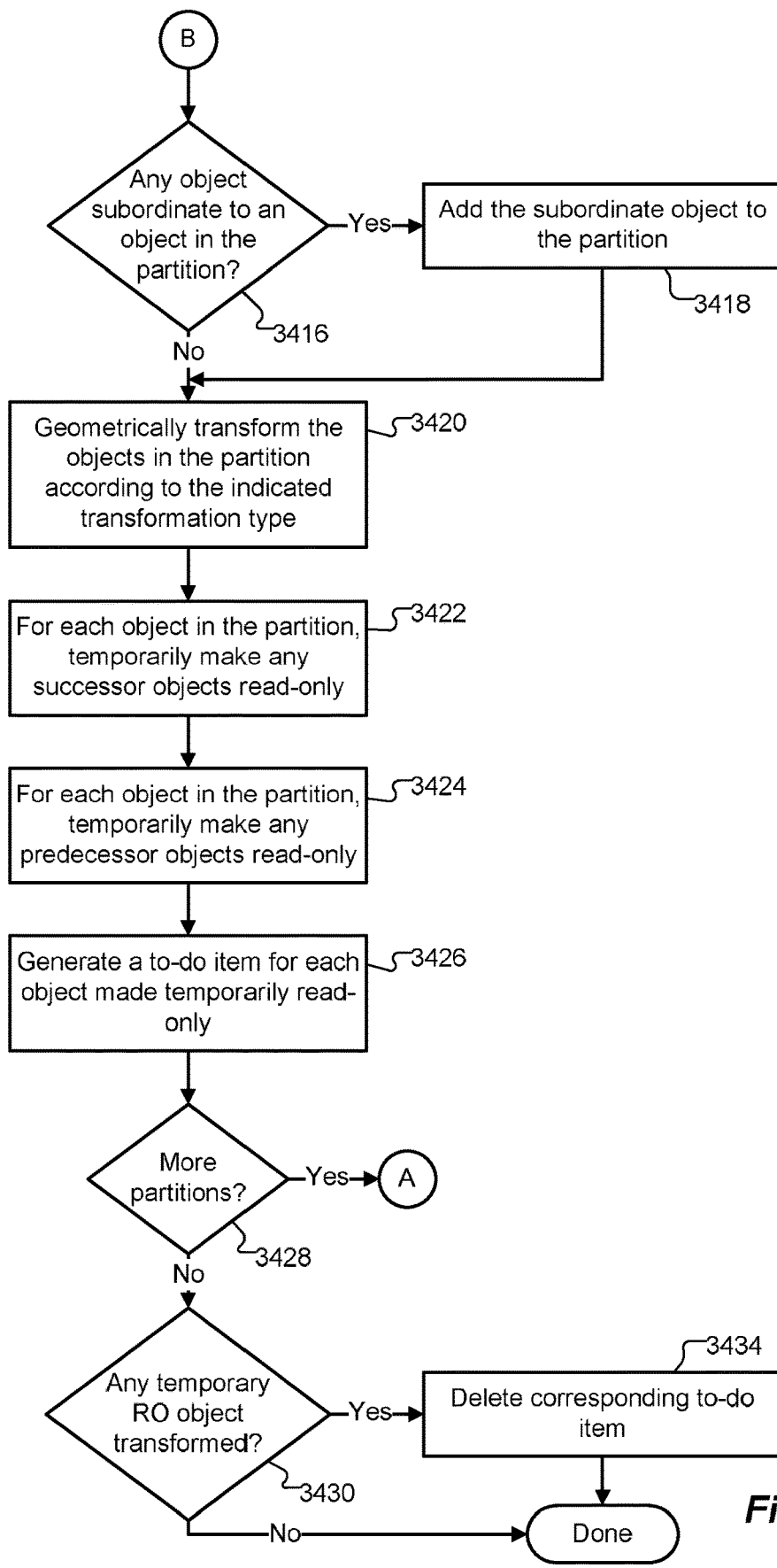

A flowchart in FIG. 34A-B schematically illustrates a computerized method for geometrically transforming a plurality of objects represented within an object-oriented enterprise engineering system, according to this alternative embodiment.

At least one of the plurality of objects is a predecessor of another of the plurality of objects. At 3400, user input is accepted to select objects to be transformed and indicate a type of transformation, such as move or rotate. At 3402, for each selected object, any predecessor objects are automatically identified. At 3404, if any external object is related to a selected object, control passes to 3406, where the relationship is disconnected.

At 3408, the selected objects are automatically divided into order partitions of objects, such that each object's predecessor objects (if any) are in the same partition or in a preceding partition. At 3410, a predecessor graph is generated. At 3412, a loop begins executing, the loop being traversed once for each partition, in order. At 3414, information about the partition is saved, sufficient to restart the geometric transformation of the partition. At 3416, a search for subordinate objects is performed. If any object subordinate to an object in the partition is found, control passes to 3418, where the subordinate object is added to the partition. At 3420, the objects in the partition are geometrically transformed, according to the transformation type indicated by the user. For each object in the partition, at 3422, if the object has any successor objects, the successor objects are temporarily made read-only (frozen). Similarly, at 3424, if any object in the partition has a predecessor object, the predecessor object is temporarily made read-only. For each object that was made temporarily read-only, at 3426, a to-do item is generated.

If there are more partitions to process, at 3428 control returns to 3424, otherwise control passes to 3430. At 3430, if any of the objects temporarily made read-only have been transformed, control passes to 3434, where the to-do item corresponding to the object is deleted.

Geometric Transformation System

Figure 35:
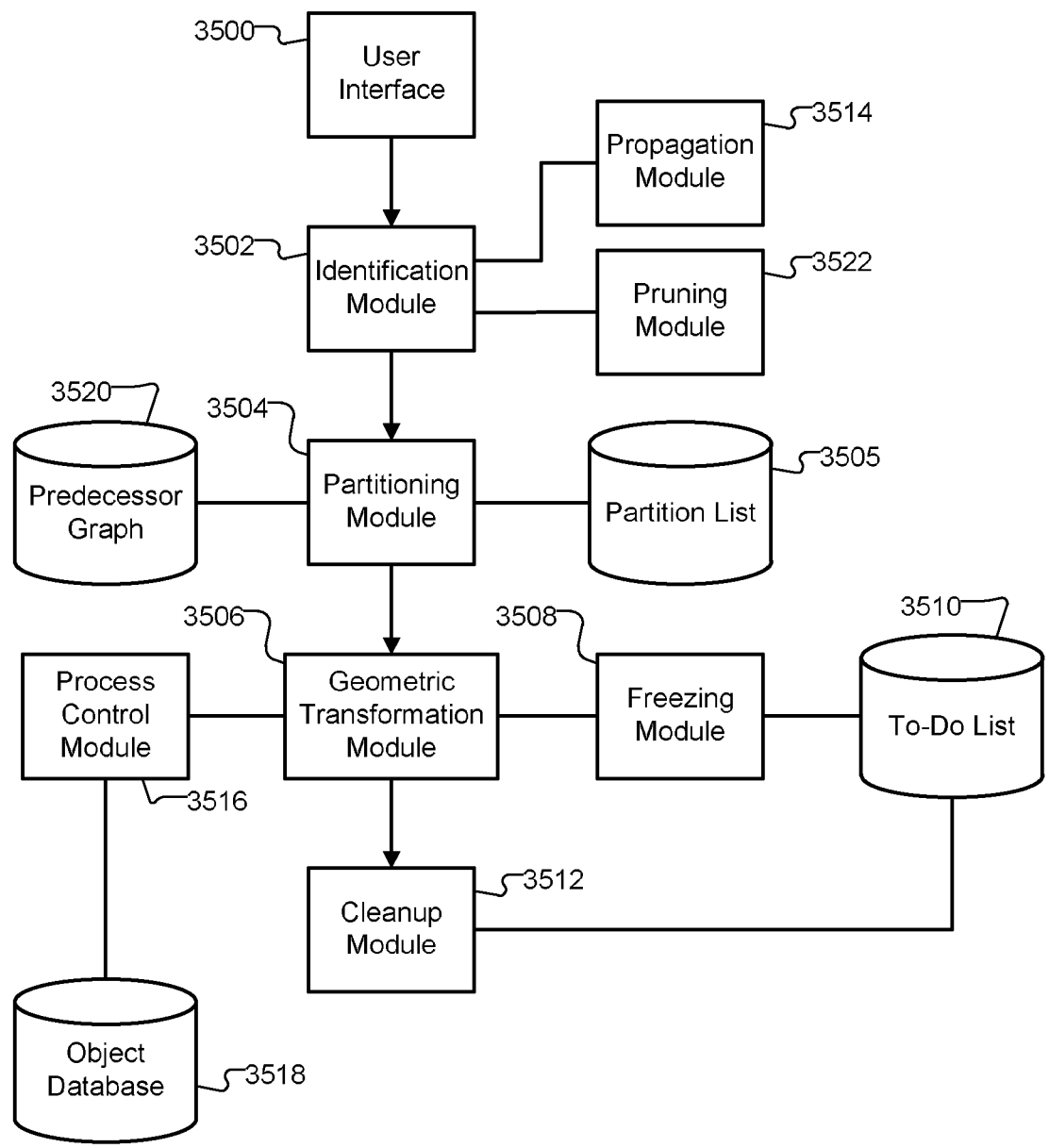
FIG. 35 contains a schematic block diagram of a system for geometrically transforming a plurality of objects represented within an object-oriented enterprise engineering system, according to an embodiment of the present invention.

FIG. 35 contains a schematic block diagram of a system for geometrically transforming a plurality of objects represented within an object-oriented enterprise engineering system, according to an embodiment of the present invention. At least one of the plurality of objects is a predecessor of another of the plurality of objects. The system includes a user interface 3500 configured to accept a first input from a user. The input selects a plurality of objects to be geometrically transformed. The user interface 3500 is also configured to accept a second input from the user indicating a type of geometric transformation that is to be performed on the selected objects. An identification module 3502 is coupled to the user interface 3500. The identification module 3502 is configured, for each selected object, to automatically identify any predecessor objects corresponding to the selected object, i.e., where a value of at least one parameter of the selected object is functionally dependent on at least one parameter of the any predecessor objects. A partitioning module 3504 is coupled to the identification module 3502 and is configured to automatically divide the selected objects into a plurality of ordered partitions of objects. For any given object, each of the object's predecessor objects is in the same partition as the given object or in a preceding partition. Partition information may be stored in a partition list 3505 or in any other suitable storage.

A transformation module 3506 is coupled to the partitioning module 3504 and is configured to geometrically transform the objects, according to the indicated type of geometric transformation. The transformation module 3506 makes two passes over the partitions, each pass being made in partition order. In the first pass, the transformation module 3506 disconnects external relationships and recalculates functional dependencies impacted by the disconnection of the external relationships. In the second pass, the transformation module 3506 transforms the objects per partition, in partition order. An optional freezing module 3508 is coupled to the transformation module 3506 and is configured to, on a per-partition basis, temporarily make any successor object of each object in the partition read-only and temporarily make any predecessor object of each object in the partition read-only. For each object that was made temporarily read-only, the freezing module 3508 is configured to generate a corresponding to-do item in an optional to-do list 3510. An optional cleanup module 3512 is coupled to the transformation module 3506. The cleanup module 3512 is configured to delete corresponding to-do items, if any of the temporarily made read-only objects is subsequently transformed.

A propagation module 3514 is coupled to the identification module 3502. The propagation module 3514 is configured, for each partition, to identify any subordinate objects of the objects in the partition. The identification module 3502 adds the identified subordinate objects to the partition. The transformation module 3506 is configured to geometrically transform the added subordinate objects, according to the indicated type of geometric transformation.

A process control module 3516 is coupled to the transformation module 3506 and is configured to process at least two of the partitions in partition order. The process control module 3516 is configured, for each partition, to save information about the partition. The saved information includes information sufficient to restart geometric transformation the objects in the partition. The information may be saved in an object database 3518 or any other suitable storage. The process control module 3516 also causes the transformation module 3506 to geometrically transform the objects in the partition, according to the indicated type of geometric transformation, before processing a subsequent partition.

The partitioning module 3504 is configured to generate a predecessor graph 3520 that relates each selected object to all the selected object's predecessor objects.

A pruning module 3522 is configured to identify at least one external object that is related to any of the selected objects. The pruning module 3522 disconnects the relationship between the identified external object and the selected object.

Although the object database 3518, the partition list 3505 and the predecessor graph 3520 are shown as separate databases, these elements may be stored in any suitable form, such as tables in one or more relational databases, in-memory data structures, non-relational database files, etc. Furthermore, some or all of these elements may be combined in a single data store, or they may be implemented as fields, pointers, values, etc. in other of the elements.

The above described methods may be performed, and the above described systems may be implemented, by a computer system, including a processor, by executing appropriate instructions stored in a memory. Apparatus for geometrically transforming a large number of objects have been described as including a processor controlled by instructions stored in a memory. The memory may be random access memory (RAM), read-only memory (ROM), flash memory or any other memory, or combination thereof, suitable for storing control software or other instructions and data. Some of the functions performed by the transformation methods and apparatus have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on tangible non-transitory non-writable storage media (e.g. read-only memory devices within a computer, such as ROM, or devices readable by a computer I/O attachment, such as CD-ROM or DVD disks), information alterably stored on tangible non-transitory writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the transformation mechanism have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. A computer-implemented method for geometrically transforming a subset of objects represented within a memory-constrained object-oriented computer-aided design system, the method comprising a processor:
   accepting input on a computer from a user, the input specifying:
   (i) a plurality of selected objects, each of the plurality of selected objects being a data structure representing a physical structure of a real-world complex system, which objects are to be geometrically transformed; and
   (ii) an indication of a type of geometric transformation to be performed on the selected objects, the geometric transformation including one or more of moving, rotating and mirroring,
   wherein the selected objects are stored in a computer-aided design system database coupled to the computer, wherein the computer has insufficient main memory to simultaneously store all the selected objects, and the computer-aided design system comprises a spatial information management system that facilitates two-dimensional and three-dimensional modeling and visualization of physical structures;
   for each selected object, automatically identifying all predecessor objects with which the selected object has a predecessor-successor relationship that exists from prior to commencement of the method to after completion of the method, the predecessor-successor relationship defined as a relationship between objects according to which:
   a value of a parameter of the selected object must be recalculated, according to an engineering relationship, when a corresponding value of a parameter of the predecessor object changes to a changed value, and
   automatically generating an ordered list of the selected objects based on predecessors of the selected objects;
   automatically dividing the list into a set of ordered partitions, wherein each selected object is a member of a partition no earlier than all its predecessor objects' partitions;
   in a first pass, for each partition in order:
   loading each object of the partition from the database into the main memory of the computer;
   automatically identifying any relationships between the objects of the partition and any objects that are not members of the plurality of selected objects;
   for each automatically identified relationship, automatically modifying the corresponding object in the main memory to sever the relationship, thereby creating a first plurality of modified objects in the main memory;
   storing the first plurality of modified objects from the main memory into the database; and
   releasing the main memory into which each object was loaded;
   after completion of the first pass, in a second pass, for each partition:
   loading of each object of the partition from the database into the main memory of the computer;
   for each object of the partition, moving, rotating or mirroring the object in the main memory to geometrically transform the object according to the type of geometric transformation to be performed, thereby creating a second plurality of modified objects in the main memory;
   storing the second plurality of modified objects from the main memory into the database; and
   releasing the main memory into which each object was loaded.

2. A method according to claim 1, wherein automatically generating the ordered list of the selected objects comprises automatically generating the ordered list, such that each selected object appears in the list no earlier than all its predecessor objects.

3. A method according to claim 1, wherein automatically generating the ordered list of the selected objects comprises automatically generating an ordered list of object identifiers of the selected objects.

4. A method according to claim 1, further comprising, for at least one partition of the ordered set of partitions:
   identifying any subordinate objects of the selected objects in the partition;
   adding the identified subordinate objects to the partition;
   loading each subordinate object of the partition from the database into the main memory of the computer;
   modifying the subordinate objects in the main memory to geometrically transform the subordinate object according to the type of geometric transformation to be performed; and
   releasing the main memory into which each subordinate object was loaded.

5. A method according to claim 1, further comprising automatically saving information about the set of ordered partitions in a non-volatile memory, wherein the information is sufficient to enable restarting the modifying the objects in the main memory to geometrically transform the objects according to the type of geometric transformation to be performed after a system failure.

6. A method according to claim 1, wherein automatically dividing the list into a set of ordered partitions comprises generating a predecessor graph that relates each selected object to all the selected object's predecessor objects.

7. A method according to claim 1, further comprising, for each object whose relationship is severed, automatically recomputing a functional dependency of the object.

8. A system for geometrically transforming a subset of objects represented within a memory-constrained object-oriented computer-aided design system, the system comprising:
   an object-oriented enterprise engineering system database that stores objects, each object representing a physical structure, wherein the enterprise engineering system comprises a spatial information management system that facilitates two-dimensional and three-dimensional modeling and visualization of physical structures;
   a user interface that accepts input from a user, wherein the input specifies a plurality of selected objects among the objects represented in the database to be geometrically transformed and an indication of a type of geometric transformation to be performed on the selected objects;

a computer comprising main memory, wherein the main memory is insufficient to simultaneously store of all the selected objects;

an identification module, coupled to the user interface and to the database, that, for each selected object, automatically identifies, among the selected objects, all predecessor objects with which the selected object has a predecessor-successor relationship, according to which: (a) a value of a parameter of the selected object must be recalculated, according to an engineering relationship, when a corresponding value of a parameter of the predecessor object changes to a changed value, and (b) the predecessor-successor relationship exists from prior to receiving the user input to after the selected objects have been geometrically transformed;

an object ordering module coupled to the identification module that automatically generates an ordered list of the selected objects based on predecessors of the selected objects;

a partitioning module coupled to the object ordering module that automatically divides the list into a set of ordered partitions, wherein each selected object is a member of a partition no earlier than all its predecessor objects' partitions;

a relationship terminator coupled to the partitioning module that automatically processes each partition, during a first pass the relationship terminator:
  loads each object of the partition from the database into the main memory of the computer;
  automatically identifies any relationships between the objects of the partition and any objects that are not members of the plurality of selected objects;
  for each automatically identified relationship, automatically modifies the corresponding object in the main memory to sever the relationship, thereby creating a first plurality of modified objects in the main memory;
  stores the first plurality of modified objects from the main memory into the database; and
  releases the main memory into which each object was loaded;

a geometric transformer coupled to the relationship terminator that automatically processes each partition, after completion of the first pass, during a second pass the geometric transformer:
  loads each object of the partition from the database into the main memory of the computer;
  for each object of the partition, modifies the object in the main memory to geometrically transform the object according to the type of geometric transformation to be performed, thereby creating a second plurality of modified objects in the main memory;
  storing the second plurality of modified objects from the main memory into the database; and
  releases the main memory into which each object was loaded.

9. A system according to claim 8, wherein the object ordering module automatically generates the ordered list, such that each selected object appears in the list no earlier than all its predecessor objects.

10. A system according to claim 8, wherein the object ordering module automatically generates an ordered list of object identifiers of the selected objects.

11. A system according to claim 8, further comprising a propagation module coupled to the identification module that, for each partition:
  identifies any subordinate objects of the selected objects in the partition;
  adds the identified subordinate objects to the partition;
  loads each subordinate object of the partition from the database into the main memory of the computer;
  modifies the subordinate objects in the main memory to geometrically transform the subordinate object according to the type of geometric transformation to be performed; and
  releases the main memory into which each subordinate object was loaded.

12. A system according to claim 8, further comprising a process control module coupled to the geometric transformer that automatically saves information about the set of ordered partitions in a non-volatile memory, wherein the information is sufficient to enable the system to restart the modification of the objects in the main memory to geometrically transform the objects according to the type of geometric transformation to be performed after a system failure.

13. A system according to claim 8, wherein the partitioning module generates a predecessor graph that relates each selected object to all the selected object's predecessor objects.

14. A system according to claim 8, further comprising an object recalculator coupled to the relationship terminator that, for each object whose relationship is severed, automatically recomputes a functional dependency of the object.

15. A computer program product for geometrically transforming a subset of objects represented within a memory-constrained object-oriented computer-aided design system, the computer program product comprising a non-transitory computer-readable medium on which are stored computer instructions that, when executed by a processor, causes the processor to:
  accept input on a computer from a user, the input specifying:
    (i) a plurality of selected objects, each of the plurality of selected objects being a data structure representing a physical structure of a real-world complex system, which objects are to be geometrically transformed; and
    (ii) an indication of a type of geometric transformation to be performed on the selected objects,
  wherein the selected objects are stored in a computer-aided design system database, wherein the computer has insufficient main memory to simultaneously store all the selected objects, and the computer-aided design system comprises a spatial information management system that facilitates two-dimensional and three-dimensional modeling and visualization of physical structures;
  for each selected object, automatically identify all predecessor objects with which the selected object has a predecessor-successor relationship that exists from prior to execution of the instructions to after execution of the instructions, the predecessor-successor relationship defined as a relationship between objects according to which: a value of a parameter of the selected object must be recalculated, according to an engineering relationship, when a corresponding value of a parameter of the predecessor object changes to a changed value, and
  automatically generate an ordered list of the selected objects based on predecessors of the selected objects;

automatically divide the list into a set of ordered partitions, wherein each selected object is a member of a partition no earlier than all its predecessor objects' partitions;

in a first pass, for each partition:
- load each object of the partition from the database into the main memory of the computer;
- automatically identify any relationships between the objects of the partition and any objects that are not members of the plurality of selected objects;
- for each automatically identified relationship, automatically modify the corresponding object in the main memory to sever the relationship, thereby creating a first plurality of modified objects in the main memory;
- store the first plurality of objects from the main memory into the database; and
- release the main memory into which each object was loaded;

after completion of the first pass, in a second pass, for each partition:
- load each object of the partition from the database into the main memory of the computer;
- for each object of the partition, modify the object in the main memory to geometrically transform the object according to the type of geometric transformation to be performed, thereby creating a second plurality of modified objects in the main memory;
- store the second plurality of modified objects from the main memory into the database; and
- release the main memory into which each object was loaded.

* * * * *